United States Patent
Petersen et al.

(10) Patent No.: US 8,473,512 B2
(45) Date of Patent: Jun. 25, 2013

(54) DYNAMIC PROFILE SLICE

(75) Inventors: Steven L. Petersen, Los Gatos, CA (US); Ravi Reddy Katpelly, Cary, NC (US)

(73) Assignee: Waldeck Technology, LLC, Portsmouth, NH (US)

( * ) Notice: Subject to any disclaimer, the term of this patent is extended or adjusted under 35 U.S.C. 154(b) by 71 days.

(21) Appl. No.: 12/941,464

(22) Filed: Nov. 8, 2010

(65) Prior Publication Data

US 2012/0066231 A1    Mar. 15, 2012

Related U.S. Application Data

(60) Provisional application No. 61/258,838, filed on Nov. 6, 2009.

(51) Int. Cl.
  *G06F 7/00* (2006.01)
  *G06F 17/30* (2006.01)

(52) U.S. Cl.
  USPC .......................................................... 707/776

(58) Field of Classification Search
  USPC ................. 707/706, 709, 722, 736, 748, 733, 707/754, 758, 776
  See application file for complete search history.

(56) References Cited

U.S. PATENT DOCUMENTS

| | | |
|---|---|---|
| 5,890,152 A | 3/1999 | Rapaport et al. |
| 6,204,844 B1 | 3/2001 | Fumarolo et al. |
| 6,308,175 B1 | 10/2001 | Lang et al. |
| 6,385,619 B1 | 5/2002 | Eichstaedt et al. |
| 6,490,587 B2 | 12/2002 | Easty et al. |
| 6,529,136 B2 | 3/2003 | Cao et al. |
| 6,611,842 B1 | 8/2003 | Brown |
| 6,701,362 B1 | 3/2004 | Subramonian et al. |
| 6,708,172 B1 | 3/2004 | Wong et al. |
| 6,819,919 B1 | 11/2004 | Tanaka |
| 7,035,863 B2 | 4/2006 | Kurapati et al. |
| 7,116,985 B2 | 10/2006 | Wilson et al. |
| 7,123,918 B1 | 10/2006 | Goodman |
| 7,162,471 B1 * | 1/2007 | Knight et al. ................. 707/750 |
| 7,236,739 B2 | 6/2007 | Chang |
| 7,247,024 B2 | 7/2007 | Bright et al. |

(Continued)

FOREIGN PATENT DOCUMENTS

| | | |
|---|---|---|
| EP | 1463354 | 12/2005 |
| WO | 2008/147252 A1 | 12/2008 |
| WO | WO 2009/055501 | 4/2009 |

OTHER PUBLICATIONS

Abstract, Yu et al., "Recommendation System Using Location-Based Ontology on Wireless Internet: An Example of Collective Intelligence by Using 'Mashup' Applications," Expert Systems with Applications, vol. 36, pp. 11675-11681, 2009, abstract printed May 13, 2009, 3 pages.

(Continued)

*Primary Examiner* — Usmaan Saeed
*Assistant Examiner* — MD. I Uddin

(57) ABSTRACT

Systems and methods are provided for maintaining a dynamic profile slice of a user profile of a user. In one embodiment, a real-time user-generated context of the user is monitored over time to accumulate keywords in the dynamic profile slice of the user that are representative of dynamic interests of the user. Weights are assigned to the keywords in the dynamic profile slice using a time and/or location weighting function.

12 Claims, 25 Drawing Sheets

U.S. PATENT DOCUMENTS

| | | | |
|---|---|---|---|
| 7,272,357 B2 | 9/2007 | Nishiga et al. | |
| 7,398,081 B2 | 7/2008 | Moran | |
| 7,403,990 B2 | 7/2008 | Nishiyama et al. | |
| 7,418,268 B1 | 8/2008 | Cabano et al. | |
| 7,423,580 B2 | 9/2008 | Markhovsky et al. | |
| 7,509,131 B2 | 3/2009 | Krumm et al. | |
| 7,558,404 B2 | 7/2009 | Ma et al. | |
| 7,620,404 B2 | 11/2009 | Chesnais et al. | |
| 7,685,192 B1* | 3/2010 | Scofield et al. | 707/709 |
| 7,787,886 B2 | 8/2010 | Markhovsky et al. | |
| 7,844,283 B2 | 11/2010 | Riise et al. | |
| 7,849,082 B2 | 12/2010 | Westphal | |
| 8,010,601 B2 | 8/2011 | Jennings et al. | |
| 8,208,943 B2 | 6/2012 | Petersen et al. | |
| 2001/0036224 A1 | 11/2001 | Demello et al. | |
| 2002/0010628 A1 | 1/2002 | Burns | |
| 2002/0049690 A1 | 4/2002 | Takano | |
| 2002/0087632 A1 | 7/2002 | Keskar | |
| 2003/0005056 A1 | 1/2003 | Yamamoto et al. | |
| 2004/0009750 A1 | 1/2004 | Beros et al. | |
| 2004/0025185 A1 | 2/2004 | Goci et al. | |
| 2004/0098386 A1 | 5/2004 | Thint et al. | |
| 2004/0098744 A1 | 5/2004 | Gutta | |
| 2005/0038876 A1 | 2/2005 | Chaudhuri | |
| 2005/0070298 A1 | 3/2005 | Caspi et al. | |
| 2005/0113123 A1 | 5/2005 | Torvinen | |
| 2005/0130634 A1 | 6/2005 | Godfrey | |
| 2005/0278317 A1 | 12/2005 | Gross et al. | |
| 2006/0046743 A1 | 3/2006 | Mirho | |
| 2006/0123080 A1 | 6/2006 | Baudino et al. | |
| 2006/0123462 A1 | 6/2006 | Lunt et al. | |
| 2006/0166679 A1 | 7/2006 | Karaoguz et al. | |
| 2006/0195361 A1 | 8/2006 | Rosenberg | |
| 2006/0229058 A1 | 10/2006 | Rosenberg | |
| 2006/0256959 A1 | 11/2006 | Hymes | |
| 2006/0282303 A1* | 12/2006 | Hale et al. | 705/10 |
| 2007/0005419 A1 | 1/2007 | Horvitz et al. | |
| 2007/0015518 A1 | 1/2007 | Winter et al. | |
| 2007/0075898 A1 | 4/2007 | Markhovsky et al. | |
| 2007/0118509 A1 | 5/2007 | Svendsen | |
| 2007/0118564 A1* | 5/2007 | Qi et al. | 707/104.1 |
| 2007/0142065 A1* | 6/2007 | Richey et al. | 455/457 |
| 2007/0149214 A1 | 6/2007 | Walsh et al. | |
| 2007/0155396 A1* | 7/2007 | Kim et al. | 455/453 |
| 2007/0156664 A1 | 7/2007 | Norton et al. | |
| 2007/0162328 A1 | 7/2007 | Reich | |
| 2007/0167174 A1 | 7/2007 | Halcrow et al. | |
| 2007/0179792 A1 | 8/2007 | Kramer | |
| 2007/0210937 A1 | 9/2007 | Smith et al. | |
| 2007/0218900 A1 | 9/2007 | Abhyanker | |
| 2007/0233671 A1 | 10/2007 | Oztekin et al. | |
| 2007/0282621 A1 | 12/2007 | Altman et al. | |
| 2008/0000964 A1 | 1/2008 | Flake et al. | |
| 2008/0086741 A1 | 4/2008 | Feldman et al. | |
| 2008/0097999 A1 | 4/2008 | Horan | |
| 2008/0113674 A1 | 5/2008 | Baig | |
| 2008/0118106 A1 | 5/2008 | Kilambi et al. | |
| 2008/0126113 A1 | 5/2008 | Manning et al. | |
| 2008/0140650 A1 | 6/2008 | Stackpole | |
| 2008/0146250 A1 | 6/2008 | Aaron | |
| 2008/0155080 A1 | 6/2008 | Marlow et al. | |
| 2008/0182591 A1 | 7/2008 | Krikorian | |
| 2008/0227473 A1 | 9/2008 | Haney | |
| 2008/0250312 A1 | 10/2008 | Curtis | |
| 2008/0288355 A1 | 11/2008 | Rosen | |
| 2008/0301166 A1 | 12/2008 | Sugiyama et al. | |
| 2008/0318597 A1 | 12/2008 | Berns et al. | |
| 2009/0023410 A1 | 1/2009 | Ghosh | |
| 2009/0030999 A1 | 1/2009 | Gatzke et al. | |
| 2009/0037355 A1 | 2/2009 | Brave et al. | |
| 2009/0048977 A1 | 2/2009 | Aggarwal et al. | |
| 2009/0082038 A1 | 3/2009 | McKiou et al. | |
| 2009/0106040 A1 | 4/2009 | Jones | |
| 2009/0112467 A1 | 4/2009 | Jiang et al. | |
| 2009/0112807 A1 | 4/2009 | Bahn | |
| 2009/0115570 A1 | 5/2009 | Cusack, Jr. | |
| 2009/0132652 A1 | 5/2009 | Athale et al. | |
| 2009/0150501 A1 | 6/2009 | Davis et al. | |
| 2009/0164431 A1 | 6/2009 | Zivkovic et al. | |
| 2009/0201896 A1 | 8/2009 | Davis et al. | |
| 2009/0210480 A1 | 8/2009 | Sivasubramaniam et al. | |
| 2009/0287783 A1 | 11/2009 | Beare et al. | |
| 2009/0307263 A1 | 12/2009 | Skibiski et al. | |
| 2010/0004857 A1 | 1/2010 | Pereira et al. | |
| 2010/0020776 A1 | 1/2010 | Youssef et al. | |
| 2010/0023338 A1 | 1/2010 | Petronelli et al. | |
| 2010/0130226 A1 | 5/2010 | Arrasvuori et al. | |
| 2010/0197219 A1 | 8/2010 | Issa et al. | |
| 2010/0197318 A1 | 8/2010 | Petersen et al. | |
| 2010/0197319 A1 | 8/2010 | Petersen et al. | |
| 2010/0198826 A1 | 8/2010 | Petersen et al. | |
| 2010/0198828 A1 | 8/2010 | Petersen et al. | |
| 2010/0198862 A1 | 8/2010 | Jennings et al. | |
| 2010/0198870 A1 | 8/2010 | Petersen et al. | |
| 2010/0198917 A1 | 8/2010 | Petersen et al. | |
| 2010/0205211 A1 | 8/2010 | Ghosh | |
| 2012/0041983 A1 | 2/2012 | Jennings | |
| 2012/0047143 A1 | 2/2012 | Petersen et al. | |
| 2012/0047152 A1 | 2/2012 | Purdy | |
| 2012/0047184 A1 | 2/2012 | Purdy | |
| 2012/0066138 A1 | 3/2012 | Curtis et al. | |

OTHER PUBLICATIONS

Agostini, A. et al., "Towards Highly Adaptive Services for Mobile Computing," In Proceedings of IFIP TC8 Working Conference on Mobile Information Systems (MOBIS), Sep. 15-17, 2004, Oslo, Norway, Springer, 2004, pp. 121-134, 14 pages.

Megliola, M. et al., "Integrating Agent and Wireless Technologies for Location-Based Services in Cultural Heritage," Digital Cultural Heritage—Essential for Tourism, 2nd EVA Conference, Vienna, Austria, Aug. 25-28, 2008, 9 pages.

Toivonen, Santtu, "Profile-Based Adaptability in the Semantic Web," ERCIM News, No. 51, Oct. 2002, at <http://www.ercim.org/publication/Ercim_News/enw51/toivonen.html>, printed May 13, 2009, 2 pages.

"Final: OpenID Attribute Exchange 1.0—Final," at <http://openid.net/specs/openid-attribute-exchange-1_0.html>, Dec. 5, 2007, printed May 11, 2012, 11 pages.

"Fire Eagle," at <http://fireeagle.yahoo.net>, copyright 2007-2011, Yahoo! Inc., printed Apr. 28, 2011, 2 pages.

"OpenID Foundation website," at <http://openid.net>, copyright 2006-2011, OpenID Foundation, printed Apr. 28, 2011, 2 pages.

Vigueras, G. et al., "A comparative study of partitioning methods for crowd simulations," Applied Soft Computing, vol. 10, Issue 1, Jan. 2010, received Dec. 20, 2008, received in revised form Jul. 1, 2009, available online Jul. 22, 2009, pp. 225-235, 12 pages.

"About Loopt," at <http://about.loopt.com/>, printed May 3, 2011, 4 pages.

Oh, Sejin et al., "CAMAR: Context-aware Mobile Augmented Reality in Smart Space," in Proceedings of International Workshop on Ubiquitous Virtual Reality 2009, Bruce Thomas et al. (Eds.), Jan. 15-18, 2009, University of South Australia, Adelaide, Australia, pp. 48-51, 4 pages.

"CitySense—Powered by Sense Networks," at <http://www.citysense.com/moreinfo.php>, copyright 2008, Sense Networks, printed Sep. 8, 2009, 2 pages.

"ConnectingCadence.com—Mapping the social world.," at <http://www.connectingcadence.com/>, found on the Internet Archive, copyright 2008, ConnectingCadence, printed Apr. 28, 2011, 1 page.

Anciaux, N. et al., "Data Degradation: Making Private Data Less Sensitive Over Time," CIKM 2008, Oct. 26-30, 2008, Napa Valley, California, 2 pages.

Behrend, Andreas, et al., "Data Stream Analysis for Location-Aware Collaborative Information Retrieval," Proceedings of the 12th East European Conference on Advances in Databases and Information Systems, Sep. 5-9, 2008, Pori, Finland, 16 pages.

Ngai, Wang Kay et al., "Efficient Clustering of Uncertain Data," Proceedings of the Sixth International Conference on Data Mining (ICDM'06), Dec. 18-22, 2006, pp. 436-445, copyright 2006, IEEE, 10 pages.

Ertoz, L. et al., "Finding Clusters of Different Sizes, Shapes, and Densities in Noisy, High Dimensional Data," Proceedings of the 2003 SIAM International Conference on Data Mining (SDM 2003), Jan. 24, 2003, pp. 47-58, San Francisco, CA, 12 pages.

"Flickr Shapefiles Public Dataset 1.0," posted by aaron on May 21, 2009, found at <http://code.flickr.com/blog/2009/05/21/flickr-shapefiles-public-dataset-10/>, Yahoo! Inc., printed Jul. 13, 2011, 5 pages.

"Friend of a Friend (FOAF) project," at <http://www.foaf-project.org/>, from the Internet Archive dated May 26, 2008, printed Aug. 10, 2012, 2 pages.

Estrin, M., "Is the MySpace crowd lying to marketers?", Oct. 16, 2007, posted at iMedia Connection, at <http://wwvv.imediaconnection.com/content/16993.asp>, copyrighted by iMedia Communications, Inc., printed Apr. 28, 2011, 2 pages.

"Loopt—About Us," at <https://Ioopt.com/loopt/aboutUs.aspx>, from the Internet Archive, dated Jun. 29, 2007, copyright 2007, Loopt, Inc., 1 page.

"MobiClique," copyright 2007-2009, Thomson, originally found at <http://wwvv.thlab.net/~apietila/mobiclique/>, printed Oct. 23, 2009, 5 pages.

Abstract, Ratti, C. et al., "Mobile Landscapes: using location data from cell phones for urban analysis," Environment and Planning B: Planning and Design, vol. 33, No. 5, 2006, pp. 727-748, 1 page.

"Plazes—Right Plaze, Right Time," at <http://plazes.com>, copyright 2004-2011, Plazes AG, printed May 3, 2011, 2 pages.

Cox, L.P. et al., "Presence-Exchanges: Toward Sustainable Presence-Sharing," in Proc. of 7th IEEE Workshop on Mobile Computing Systems and Applications, Apr. 6-7, 2006, Semiahmoo Resort, Washington, pp. 55-60, 6 pages.

Abstract, "Self-Organized Pedestrian Crowd Dynamics: Experiments, Simulations, and Design Solutions," by Helbing, D. et al., Transportation Science, vol. 39, Issue 1, Feb. 2005, obtained from ACM Digital Library at <http://portal.acm.org/citation.cfm?id=1247227>, printed Apr. 28, 2011, 2 pages.

"Sense Networks," at <http://www.sensenetworks.com/about_us.php>, copyright 2008-2010, Sense Networks, printed Apr. 28, 2011, 1 page.

"Sense Networks—Machine Learning," at <http://www.sensenetworks.com/machine_learning.php>, copyright 2008-2009, Sense Networks, printed Jan. 12, 2009, 2 pages.

"Sense Networks—Technology," at <http://www.sensenetworks.com/technology.php>, copyright 2008-2009, Sense Networks, printed Jan. 12, 2009, 2 pages.

Abstract, "Sensor networks for social networks," by Farry, M.P., Thiesis, Dept. of Electrical Engineering and Computer Science, Massachusetts Institute of Technology, Feb. 2006, obtained from Dspace@MIT, at <http://dspace.mit.edu/handle/1721.1/36764>, printed Apr. 28, 2011, 3 pages.

* cited by examiner

NEW BOUNDING BOX

NEW BOUNDING BOX

DYNAMIC PROFILE SLICE

RELATED APPLICATIONS

This application claims the benefit of provisional patent application Ser. No. 61/258,838, filed Nov. 6, 2009, the disclosure of which is hereby incorporated herein by reference in its entirety.

FIELD OF THE DISCLOSURE

The present disclosure relates to maintaining and using a dynamic profile slice of a user profile of a user.

BACKGROUND

Social network profile information is relatively static in nature. For example, after a Facebook® user sets up his profile the first time, he often does not edit his profile for a long time. In other words, typical social network user profiles tend to represent static attributes of their owners. As such, when using the user profiles, dynamic attributes of the users may not be adequately represented.

SUMMARY

The present disclosure relates to maintaining a dynamic profile slice of a user profile of a user. In one embodiment, a real-time user-generated context of the user is monitored over time to accumulate keywords in the dynamic profile slice of the user that are representative of dynamic interests of the user along with, for each keyword in the dynamic profile slice, a corresponding timestamp defining a time at which the keyword was most recently obtained from the real-time user-generated context of the user. A weight is assigned to each keyword in the dynamic profile slice based on an amount of time that has elapsed since the most recent time at which the keyword was obtained from the real-time user-generated context of the user as indicated by the timestamp for the keyword.

In another embodiment, a real-time user-generated context of the user is monitored over time to accumulate keywords in the dynamic profile slice of the user that are representative of dynamic interests of the user along with, for each keyword in the dynamic profile slice, a location stamp that defines a location at which the user was located when the keyword was obtained from the real-time user-generated context of the user. A weight is assigned to each keyword in the dynamic profile slice based on a distance between a current location of the user and the location at which the user was located when the keyword was obtained from the real-time user-generated context of the user as indicated by the location stamp for the keyword.

In yet another embodiment, a real-time user-generated context of the user is monitored over time to accumulate keywords in the dynamic profile slice of the user that are representative of dynamic interests of the user along with, for each keyword in the dynamic profile slice, a corresponding timestamp defining a time at which the keyword was most recently obtained from the real-time user-generated context of the user and a location stamp that defines a location at which the user was located when the keyword was obtained from the real-time user-generated context of the user. A weight is assigned to each keyword in the dynamic profile slice based on an amount of time that has elapsed since the most recent time at which the keyword was obtained from the real-time user-generated context of the user as indicated by the timestamp for the keyword and a distance between a current location of the user and the location at which the user was located when the keyword was obtained from the real-time user-generated context of the user as indicated by the location stamp for the keyword.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

Figure 1:
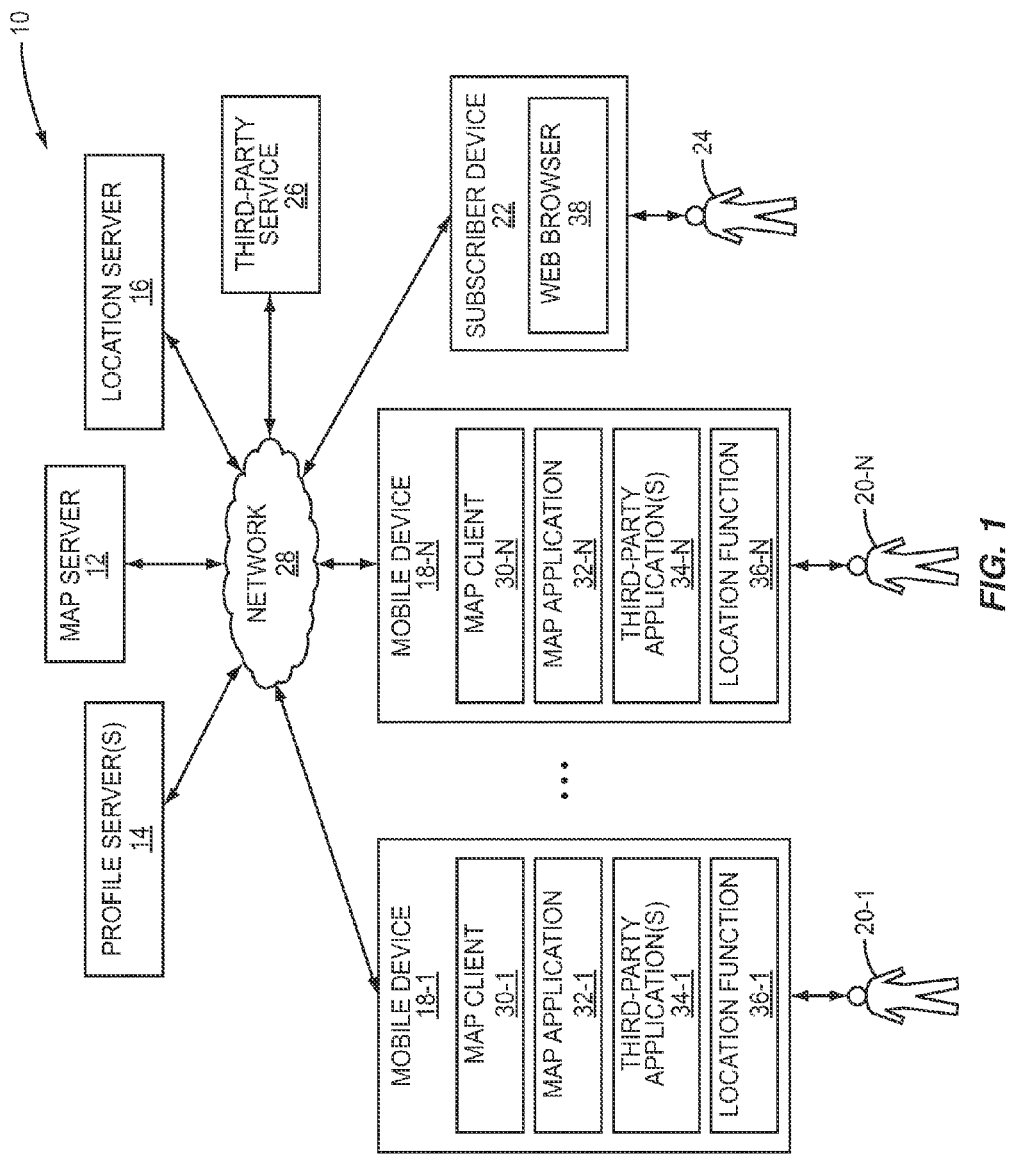
FIG. 1 illustrates a Mobile Aggregate Profile (MAP) system according to one embodiment of the present disclosure.
Figure 6:
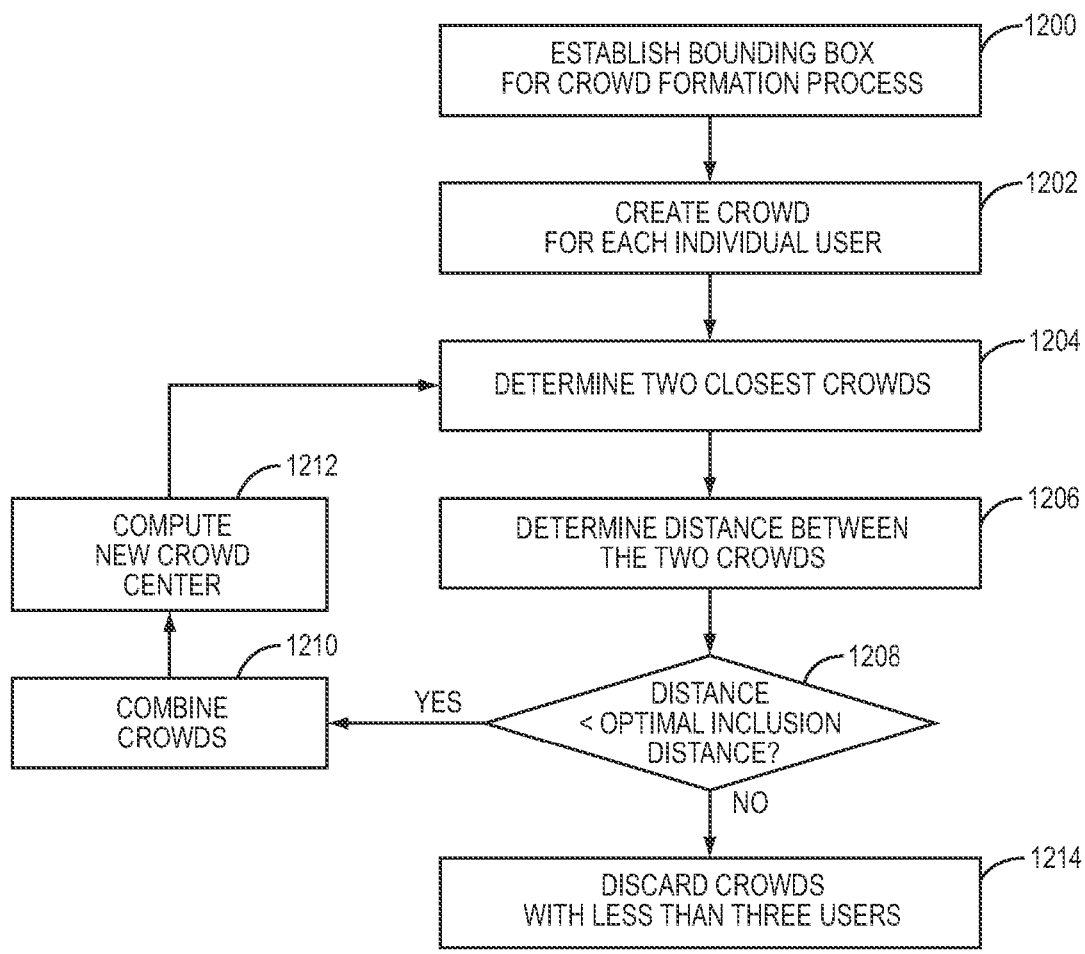
FIG. 6 is a flow chart for a spatial crowd formation process according to one embodiment of the present disclosure.
Figure 12:
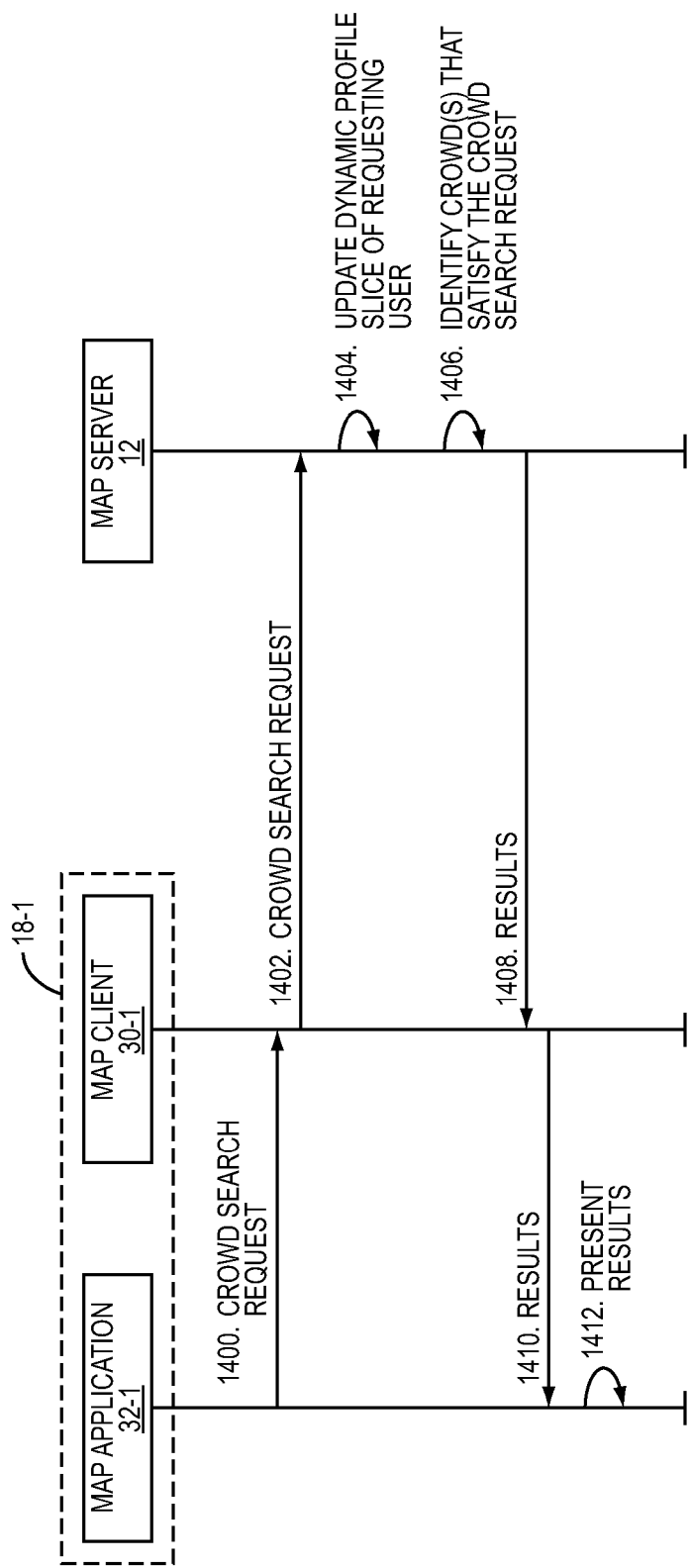
Figure 13:
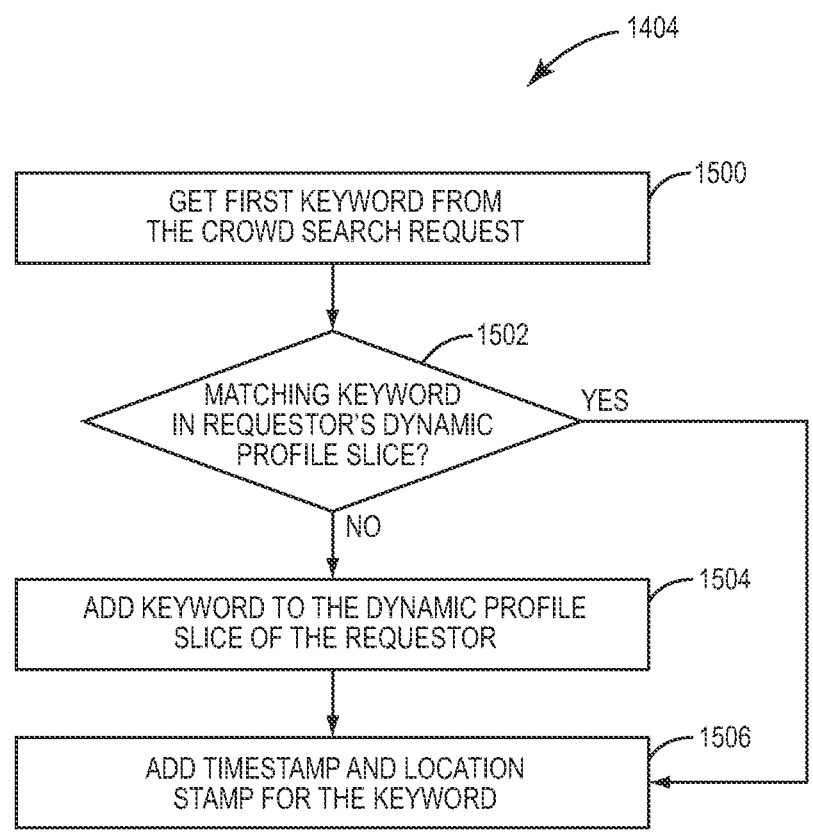
Figure 14:
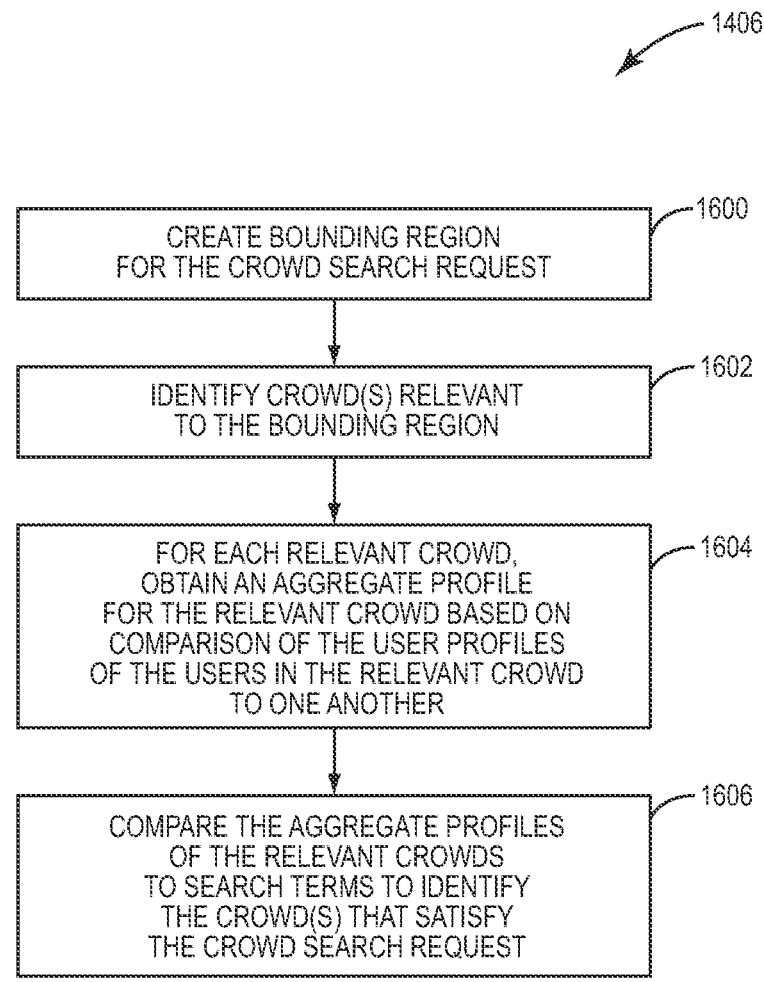
Figure 15:
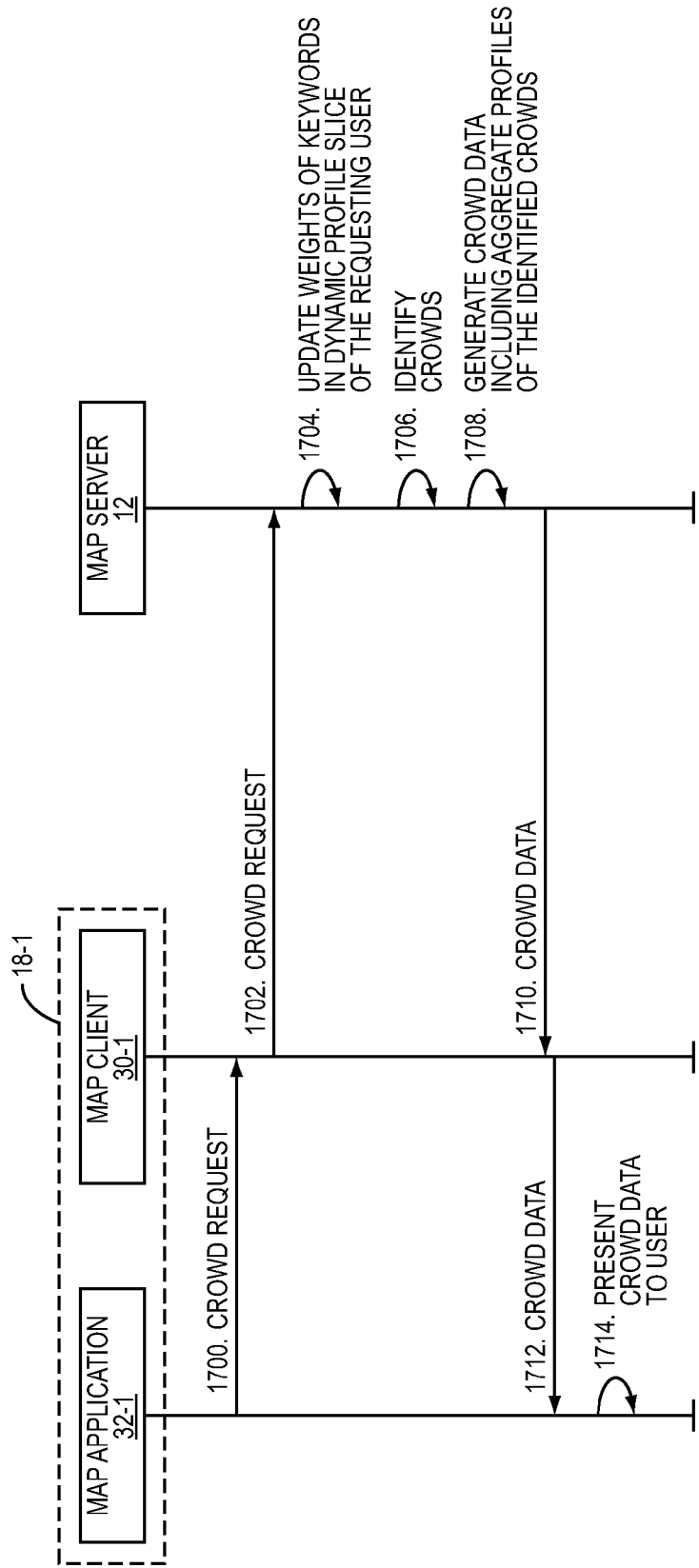
Figure 16:
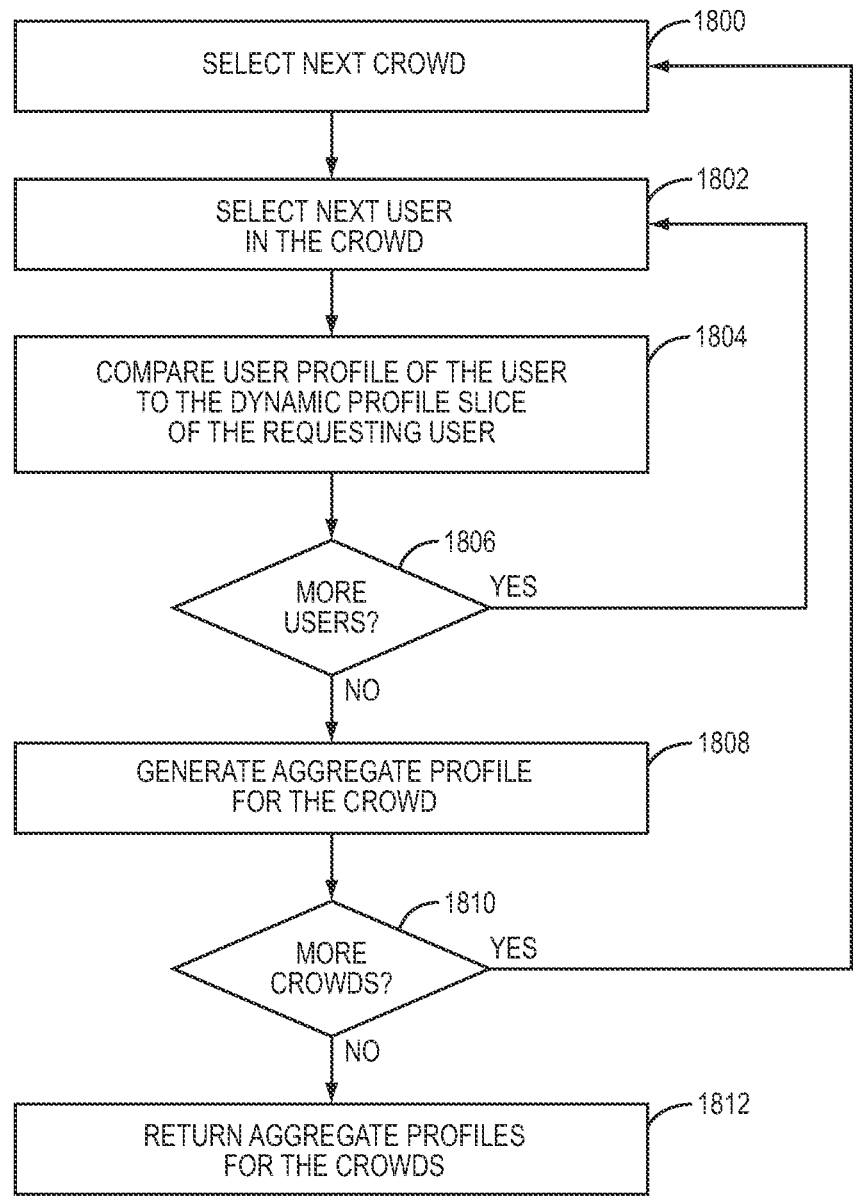
Figure 17:
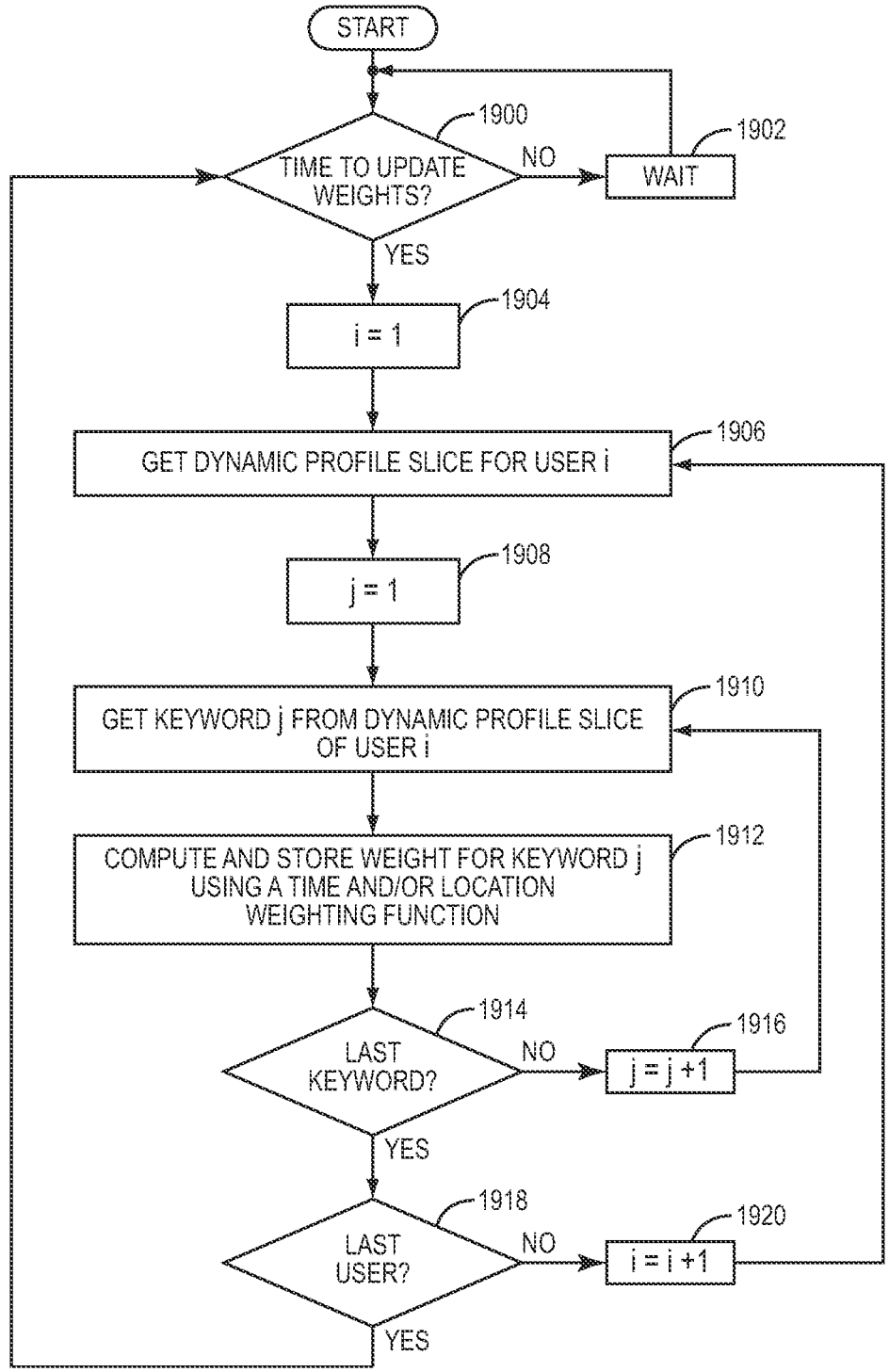
Figure 18:
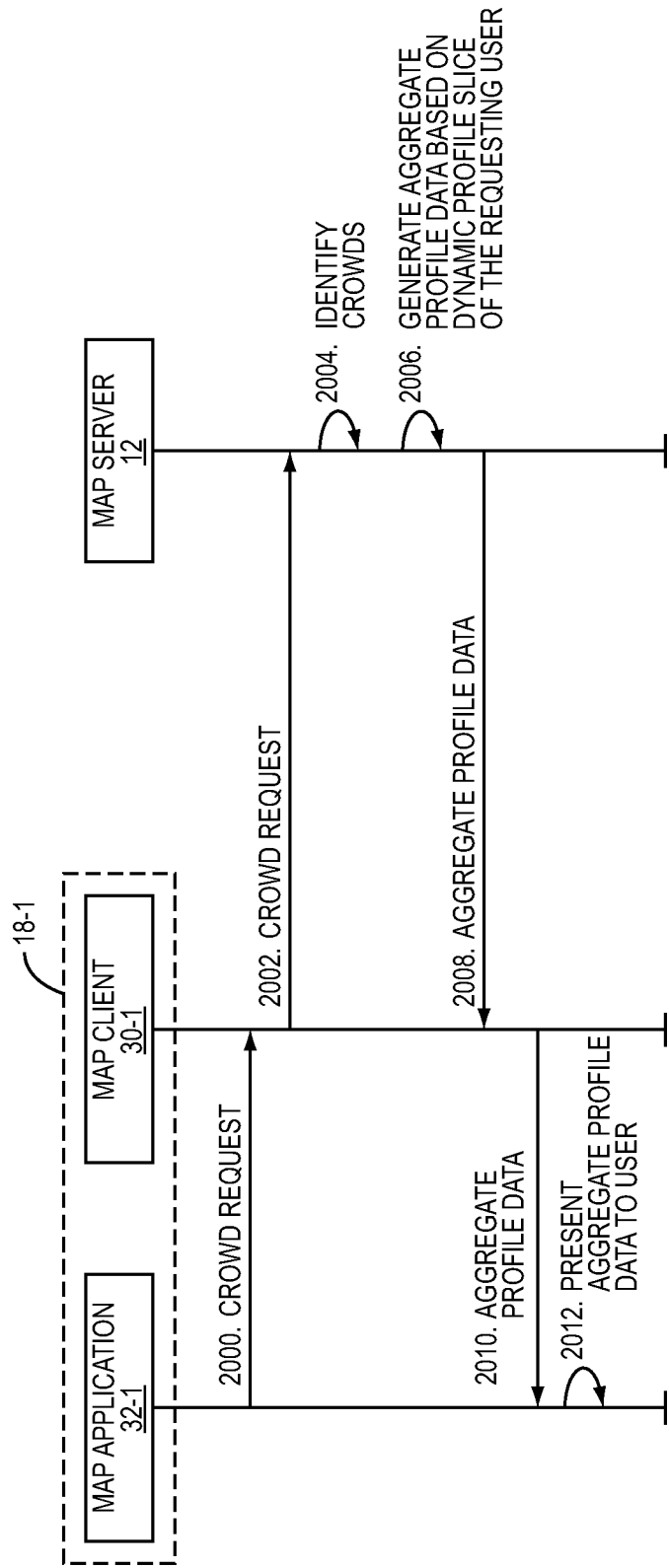
Figure 19:
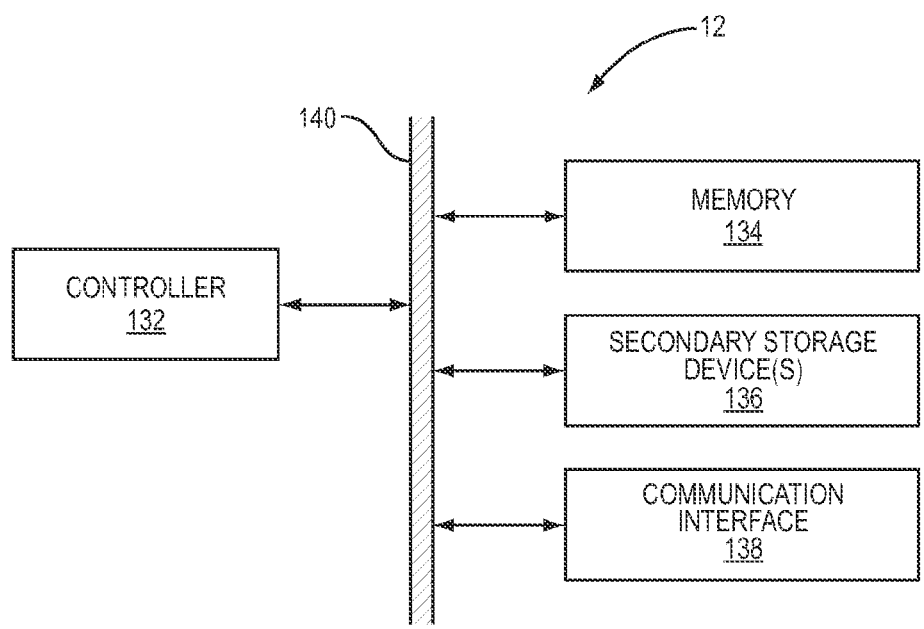
Figure 20:
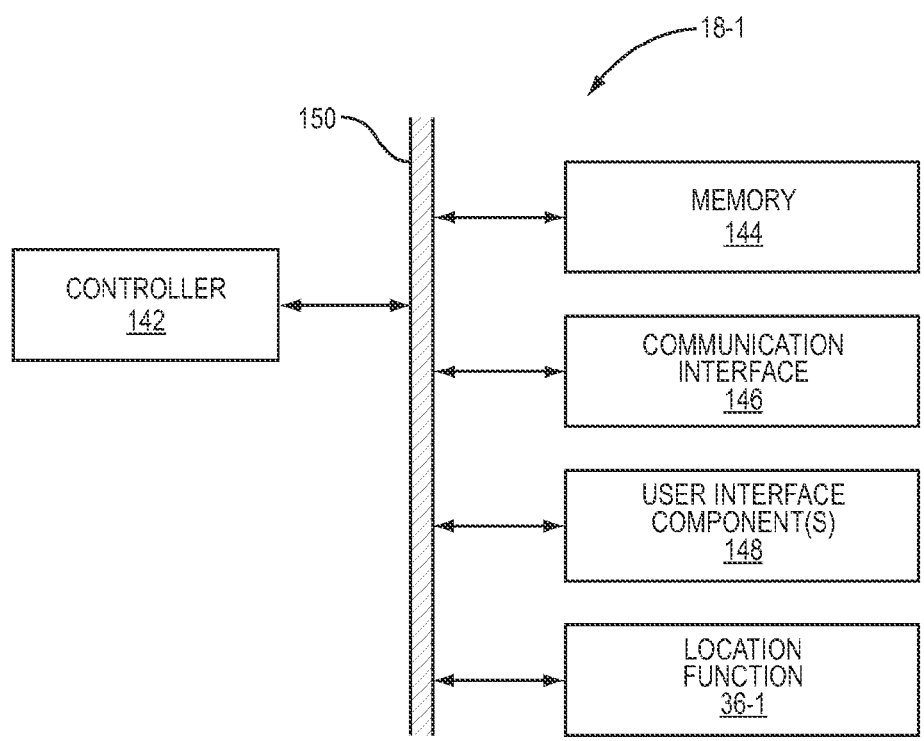

FIGS. 7A through 7D graphically illustrate the crowd formation process of FIG. 6 for an exemplary bounding box;

FIGS. 8A through 8D illustrate a flow chart for a spatial crowd formation process according to another embodiment of the present disclosure;

FIGS. 9A through 9D graphically illustrate the crowd formation process of FIGS. 8A through 8D for a scenario where the crowd formation process is triggered by a location update for a user having no old location;

FIGS. 10A through 10F graphically illustrate the crowd formation process of FIGS. 8A through 8D for a scenario where the new and old bounding boxes overlap;

FIGS. 11A through 11E graphically illustrate the crowd formation process of FIGS. 8A through 8D in a scenario where the new and old bounding boxes do not overlap;

FIG. 12 illustrates the operation of the system of FIG. 1 to monitor a real-time user-generated context of a user, specifically crowd search requests of a user, in order to accumulate keywords for a dynamic profile slice of the user according to one embodiment of the present disclosure;

FIG. 13 illustrates the operation of the system of FIG. 1 to update the dynamic profile slice of a user in response to receiving a crowd search request according to one embodiment of the present disclosure;

FIG. 14 illustrates the operation of the MAP server to serve a crowd search request according to one embodiment of the present disclosure;

FIG. 15 illustrates the operation of the system of FIG. 1 to update weights assigned to keywords in a dynamic profile slice of a user in response to receiving a crowd request from the user according to one embodiment of the present disclosure;

FIG. 16 illustrates a process for generating aggregate profiles for crowds based on the dynamic profile slice of the requesting user according to one embodiment of the present disclosure;

FIG. 17 illustrates a process for periodically updating weights assigned to keywords in dynamic profile slices of user profiles of a number of users according to one embodiment of the present disclosure;

FIG. 18 illustrates the operation of the system of FIG. 1 to process crowd requests where aggregate profiles of crowds identified in response to the crowd requests are generated based on the weights assigned to the keywords in the dynamic profile slice of the requesting user in the process of FIG. 17 according to one embodiment of the present disclosure;

FIG. 19 is a block diagram of the MAP server of FIG. 1 according to one embodiment of the present disclosure; and FIG. 20 is a block diagram of one of the mobile devices of FIG. 1 according to one embodiment of the present disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

FIG. 1 illustrates a Mobile Aggregate Profile (MAP) system 10 (hereinafter "system 10") according to one embodiment of the present disclosure. Note that the system 10 is exemplary and is not intended to limit the scope of the present disclosure. In this embodiment, the system 10 includes a MAP server 12, one or more profile servers 14, a location server 16, a number of mobile devices 18-1 through 18-N (generally referred to herein collectively as mobile devices 18 and individually as mobile device 18) having associated users 20-1 through 20-N (generally referred to herein collectively as users 20 and individually as user 20), a subscriber device 22 having an associated subscriber 24, and a third-party service 26 communicatively coupled via a network 28. The network 28 may be any type of network or any combination of networks.

Specifically, the network 28 may include wired components, wireless components, or both wired and wireless components. In one exemplary embodiment, the network 28 is a distributed public network such as the Internet, where the mobile devices 18 are enabled to connect to the network 28 via local wireless connections (e.g., Wi-Fi® or IEEE 802.11 connections) or wireless telecommunications connections (e.g., 3G or 4G telecommunications connections such as GSM, LTE, W-CDMA, or WiMAX® connections).

As discussed below in detail, the MAP server 12 operates to obtain current locations, including location updates, and user profiles of the users 20 of the mobile devices 18. The current locations of the users 20 can be expressed as positional geographic coordinates such as latitude-longitude pairs, and a height vector (if applicable), or any other similar information capable of identifying a given physical point in space in a two-dimensional or three-dimensional coordinate system. Using the current locations and user profiles of the users 20, the MAP server 12 is enabled to provide a number of features such as, but not limited to, forming crowds of users using current locations and/or user profiles of the users 20, generating aggregate profiles for crowds of users, and tracking crowds. Note that while the MAP server 12 is illustrated as a single server for simplicity and ease of discussion, it should be appreciated that the MAP server 12 may be implemented as a single physical server or multiple physical servers operating in a collaborative manner for purposes of redundancy and/or load sharing.

In general, the one or more profile servers 14 operate to store user profiles for a number of persons including the users 20 of the mobile devices 18. For example, the one or more profile servers 14 may be servers providing social network services such as the Facebook® social networking service, the MySpace® social networking service, the LinkedIN® social networking service, or the like. As discussed below, using the one or more profile servers 14, the MAP server 12 is enabled to directly or indirectly obtain the user profiles of the users 20 of the mobile devices 18. The location server 16 generally operates to receive location updates from the mobile devices 18 and make the location updates available to entities such as, for instance, the MAP server 12. In one exemplary embodiment, the location server 16 is a server operating to provide Yahoo!'s FireEagle service.

The mobile devices 18 may be mobile smart phones, portable media player devices, mobile gaming devices, or the like. Some exemplary mobile devices that may be programmed or otherwise configured to operate as the mobile devices 18 are the Apple® iPhone®, the Palm Pre®, the Samsung Rogue™, the Blackberry Storm™, the Motorola DROID or similar phone running Google's Android™ Operating System, an Apple® iPad™, and the Apple® iPod Touch® device. However, this list of exemplary mobile devices is not exhaustive and is not intended to limit the scope of the present disclosure.

The mobile devices 18-1 through 18-N include MAP clients 30-1 through 30-N (generally referred to herein collectively as MAP clients 30 or individually as MAP client 30), MAP applications 32-1 through 32-N (generally referred to herein collectively as MAP applications 32 or individually as MAP application 32), third-party applications 34-1 through 34-N (generally referred to herein collectively as third-party applications 34 or individually as third-party application 34), and location functions 36-1 through 36-N (generally referred to herein collectively as location functions 36 or individually as location function 36), respectively. The MAP client 30 is preferably implemented in software. In general, in the preferred embodiment, the MAP client 30 is a middleware layer operating to interface an application layer (i.e., the MAP application 32 and the third-party applications 34) to the MAP server 12. More specifically, the MAP client 30 enables the MAP application 32 and the third-party applications 34 to request and receive data from the MAP server 12. In addition, the MAP client 30 enables applications, such as the MAP application 32 and the third-party applications 34, to access data from the MAP server 12.

The MAP application 32 is also preferably implemented in software. The MAP application 32 generally provides a user interface component between the user 20 and the MAP server 12. More specifically, among other things, the MAP application 32 enables the user 20 to initiate crowd search requests or requests for crowd data from the MAP server 12 and presents corresponding data returned by the MAP server 12 to the user 20. The MAP application 32 also enables the user 20 to configure various settings. For example, the MAP application 32 may enable the user 20 to select a desired social networking service (e.g., Facebook®, MySpace®, LinkedIN®, etc.) from which to obtain the user profile of the user 20 and provide any necessary credentials (e.g., username and password) needed to access the user profile from the social networking service.

The third-party applications 34 are preferably implemented in software. The third-party applications 34 operate to access the MAP server 12 via the MAP client 30. The third-party applications 34 may utilize data obtained from the MAP server 12 in any desired manner. As an example, one of the third-party applications 34 may be a gaming application that utilizes crowd data to notify the user 20 of Points of Interest (POIs) or Areas of Interest (AOIs) where crowds of interest are currently located. It should be noted that while the MAP client 30 is illustrated as being separate from the MAP application 32 and the third-party applications 34, the present disclosure is not limited thereto. The functionality of the MAP client 30 may alternatively be incorporated into the MAP application 32 and the third-party applications 34.

The location function 36 may be implemented in hardware, software, or a combination thereof. In general, the location function 36 operates to determine or otherwise obtain the location of the mobile device 18. For example, the location function 36 may be or include a Global Positioning System (GPS) receiver. In addition or alternatively, the location function 36 may include hardware and/or software that enables improved location tracking in indoor environments such as, for example, shopping malls. For example, the location function 36 may be part of or compatible with the InvisiTrack Location System provided by InvisiTrack and described in U.S. Pat. No. 7,423,580 entitled "Method and System of Three-Dimensional Positional Finding" which issued on Sep. 9, 2008, U.S. Pat. No. 7,787,886 entitled "System and Method for Locating a Target using RFID" which issued on Aug. 31, 2010, and U.S. Patent Application Publication No. 2007/0075898 entitled "Method and System for Positional Finding Using RF, Continuous and/or Combined Movement" which published on Apr. 5, 2007, all of which are hereby incorporated herein by reference for their teachings regarding location tracking.

The subscriber device 22 is a physical device such as a personal computer, a mobile computer (e.g., a notebook computer, a netbook computer, a tablet computer, etc.), a mobile smart phone, or the like. The subscriber 24 associated with the subscriber device 22 is a person or entity. In general, the subscriber device 22 enables the subscriber 24 to access the MAP server 12 via a web browser 38 to obtain various types of data, preferably for a fee. For example, the subscriber 24 may pay a fee to have access to crowd data such as aggregate profiles for crowds located at one or more POIs and/or located in one or more AOIs, pay a fee to track crowds, or the like. Note that the web browser 38 is exemplary. In another embodiment, the subscriber device 22 is enabled to access the MAP server 12 via a custom application.

Lastly, the third-party service 26 is a service that has access to data from the MAP server 12 such as aggregate profiles for one or more crowds at one or more POIs or within one or more AOIs. Based on the data from the MAP server 12, the third-party service 26 operates to provide a service such as, for example, targeted advertising. For example, the third-party service 26 may obtain anonymous aggregate profile data for one or more crowds located at a POI and then provide targeted advertising to known users located at the POI based on the anonymous aggregate profile data. Note that while targeted advertising is mentioned as an exemplary third-party service 26, other types of third-party services 26 may additionally or alternatively be provided. Other types of third-party services 26 that may be provided will be apparent to one of ordinary skill in the art upon reading this disclosure.

Before proceeding, it should be noted that while the system 10 of FIG. 1 illustrates an embodiment where the one or more profile servers 14 and the location server 16 are separate from the MAP server 12, the present disclosure is not limited thereto. In an alternative embodiment, the functionality of the one or more profile servers 14 and/or the location server 16 may be implemented within the MAP server 12.

Figure 2:
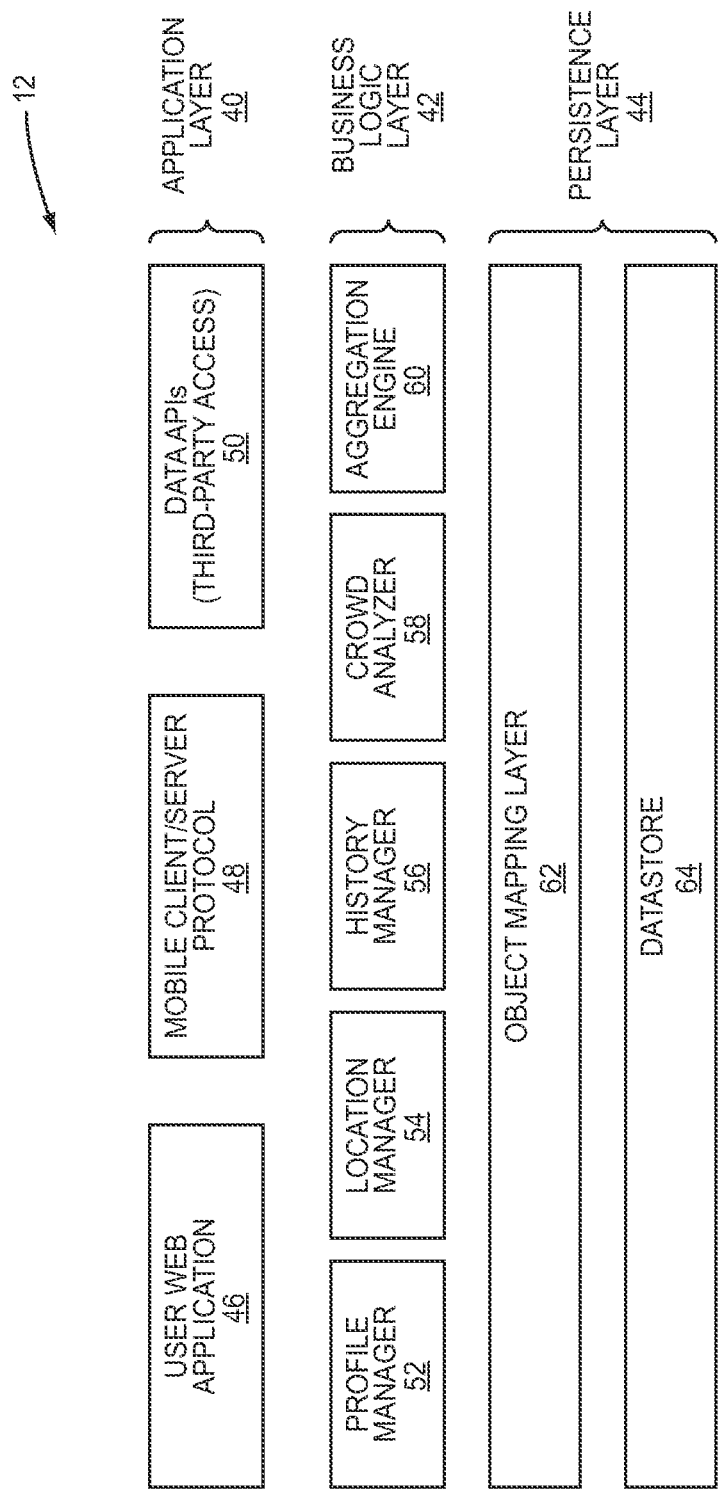
FIG. 2 is a block diagram of the MAP server of FIG. 1 according to one embodiment of the present disclosure.

FIG. 2 is a block diagram of the MAP server 12 of FIG. 1 according to one embodiment of the present disclosure. As illustrated, the MAP server 12 includes an application layer 40, a business logic layer 42, and a persistence layer 44. The application layer 40 includes a user web application 46, a mobile client/server protocol component 48, and one or more data Application Programming Interfaces (APIs) 50. The user web application 46 is preferably implemented in software and operates to provide a web interface for users, such as the subscriber 24, to access the MAP server 12 via a web browser. The mobile client/server protocol component 48 is preferably implemented in software and operates to provide an interface between the MAP server 12 and the MAP clients 30 hosted by the mobile devices 18. The data APIs 50 enable third-party services, such as the third-party service 26, to access the MAP server 12.

The business logic layer 42 includes a profile manager 52, a location manager 54, a history manager 56, a crowd analyzer 58, and an aggregation engine 60, each of which is preferably implemented in software. The profile manager 52 generally operates to obtain the user profiles of the users 20 directly or indirectly from the one or more profile servers 14 and store the user profiles in the persistence layer 44. In addition, as described below in detail, the profile manager 52 also operates to maintain dynamic profile slices in the user profiles of the users 20 that reflect dynamic interests of the users 20 by monitoring real-time user-generated contexts of the users 20. As described below, the real-time user-generated contexts of the users 20 are preferably search terms entered in a crowd search feature provided by the system 10. However, the present disclosure is not limited thereto. Other types of real-time user-generated contexts may be monitored in addition to or as an alternative to the search terms entered into the crowd search feature. Some exemplary real-time user-generated contexts are, but are not limited to, search terms entered into a third-party search feature; topics of conversation on a message board, instant messaging, or other platform; posts to a blog; posts to a microblog; or the like. In addition to using real-time user-generated contexts, other types of contextual information may be used such as, but not limited to, data obtained by one or more sensors of the mobile devices 18 of the users 20. The location manager 54 operates to obtain the current locations of the users 20 including location updates. As discussed below, the current locations of the users 20 may be obtained directly from the mobile devices 18 and/or obtained from the location server 16.

The history manager 56 generally operates to maintain a historical record of anonymized user profile data by location. Note that while the user profile data stored in the historical record is preferably anonymized, it is not limited thereto. The crowd analyzer 58 operates to form crowds of users. In one embodiment, the crowd analyzer 58 utilizes a spatial crowd formation algorithm. However, the present disclosure is not limited thereto. In addition, the crowd analyzer 58 may further characterize crowds to reflect degree of fragmentation, best-case and worst-case degree of separation (DOS), and/or degree of bi-directionality. Still further, the crowd analyzer 58 may also operate to track crowds. The aggregation engine 60 generally operates to provide aggregate profile data in response to requests from the mobile devices 18, the subscriber device 22, and the third-party service 26. The aggregate profile data may be historical aggregate profile data for one or more POIs or one or more AOIs or aggregate profile data for crowd(s) currently at one or more POIs or within one or more AOIs. For additional information regarding the operation of the profile manager 52, the location manager 54, the history manager 56, the crowd analyzer 58, and the aggregation engine 60, the interested reader is directed to U.S. patent application Ser. No. 12/645,532, entitled FORMING CROWDS AND PROVIDING ACCESS TO CROWD DATA IN A MOBILE ENVIRONMENT, which was filed Dec. 23, 2009; U.S. patent application Ser. No. 12/645,539, entitled ANONYMOUS CROWD TRACKING, which was filed Dec. 23, 2009; U.S. patent application Ser. No. 12/645,535, entitled MAINTAINING A HISTORICAL RECORD OF ANONYMIZED USER PROFILE DATA BY LOCATION FOR USERS IN A MOBILE ENVIRONMENT, which was filed Dec. 23, 2009; U.S. patent application Ser. No. 12/645,546, entitled CROWD FORMATION FOR MOBILE DEVICE USERS, which was filed Dec. 23, 2009; U.S. patent application Ser. No. 12/645,556, entitled SERVING A REQUEST FOR DATA FROM A HISTORICAL RECORD OF ANONYMIZED USER PROFILE DATA IN A MOBILE ENVIRONMENT, which was filed Dec. 23, 2009; U.S. patent application Ser. No. 12/645,560, entitled HANDLING CROWD REQUESTS FOR LARGE GEOGRAPHIC AREAS, which was filed Dec. 23, 2009; and U.S. patent application Ser. No. 12/645,544, entitled MODIFYING A USER'S CONTRIBUTION TO AN AGGREGATE PROFILE BASED ON TIME BETWEEN LOCATION UPDATES AND EXTERNAL EVENTS, which was filed Dec. 23, 2009; all of which have been incorporated herein by reference in their entireties.

The persistence layer 44 includes an object mapping layer 62 and a datastore 64. The object mapping layer 62 is preferably implemented in software. The datastore 64 is preferably a relational database, which is implemented in a combination of hardware (i.e., physical data storage hardware) and software (i.e., relational database software). In this embodiment, the business logic layer 42 is implemented in an object-oriented programming language such as, for example, Java. As such, the object mapping layer 62 operates to map objects used in the business logic layer 42 to relational database entities stored in the datastore 64. Note that, in one embodiment, data is stored in the datastore 64 in a Resource Description Framework (RDF) compatible format.

In an alternative embodiment, rather than being a relational database, the datastore 64 may be implemented as an RDF datastore. More specifically, the RDF datastore may be compatible with RDF technology adopted by Semantic Web activities. Namely, the RDF datastore may use the Friend-Of-A-Friend (FOAF) vocabulary for describing people, their social networks, and their interests. In this embodiment, the MAP server 12 may be designed to accept raw FOAF files describing persons, their friends, and their interests. These FOAF files are currently output by some social networking services such as LiveJournal® and Facebook®. The MAP server 12 may then persist RDF descriptions of the users 20 as a proprietary extension of the FOAF vocabulary that includes additional properties desired for the system 10.

Figure 3:
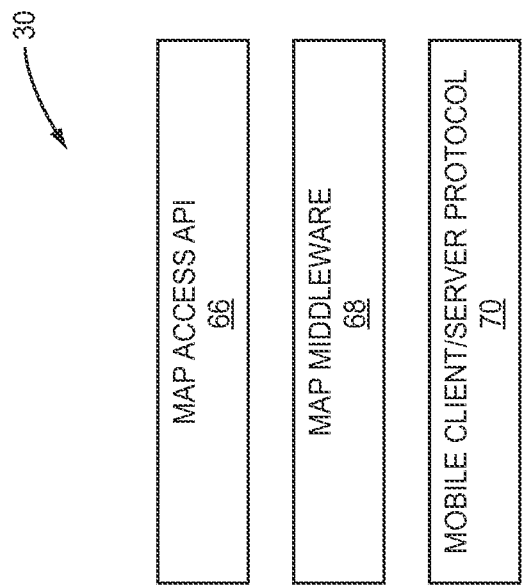
FIG. 3 is a block diagram of the MAP client of one of the mobile devices of FIG. 1 according to one embodiment of the present disclosure.

FIG. 3 illustrates the MAP client 30 of FIG. 1 in more detail according to one embodiment of the present disclosure. As illustrated, in this embodiment, the MAP client 30 includes a MAP access API 66, a MAP middleware component 68, and a mobile client/server protocol component 70. The MAP access API 66 is implemented in software and provides an interface by which the MAP client 30 and the third-party applications 34 are enabled to access the MAP client 30. The MAP middleware component 68 is implemented in software and performs the operations needed for the MAP client 30 to operate as an interface between the MAP application 32 and the third-party applications 34 at the mobile device 18 and the MAP server 12. The mobile client/server protocol component 70 enables communication between the MAP client 30 and the MAP server 12 via a defined protocol.

Figure 4:
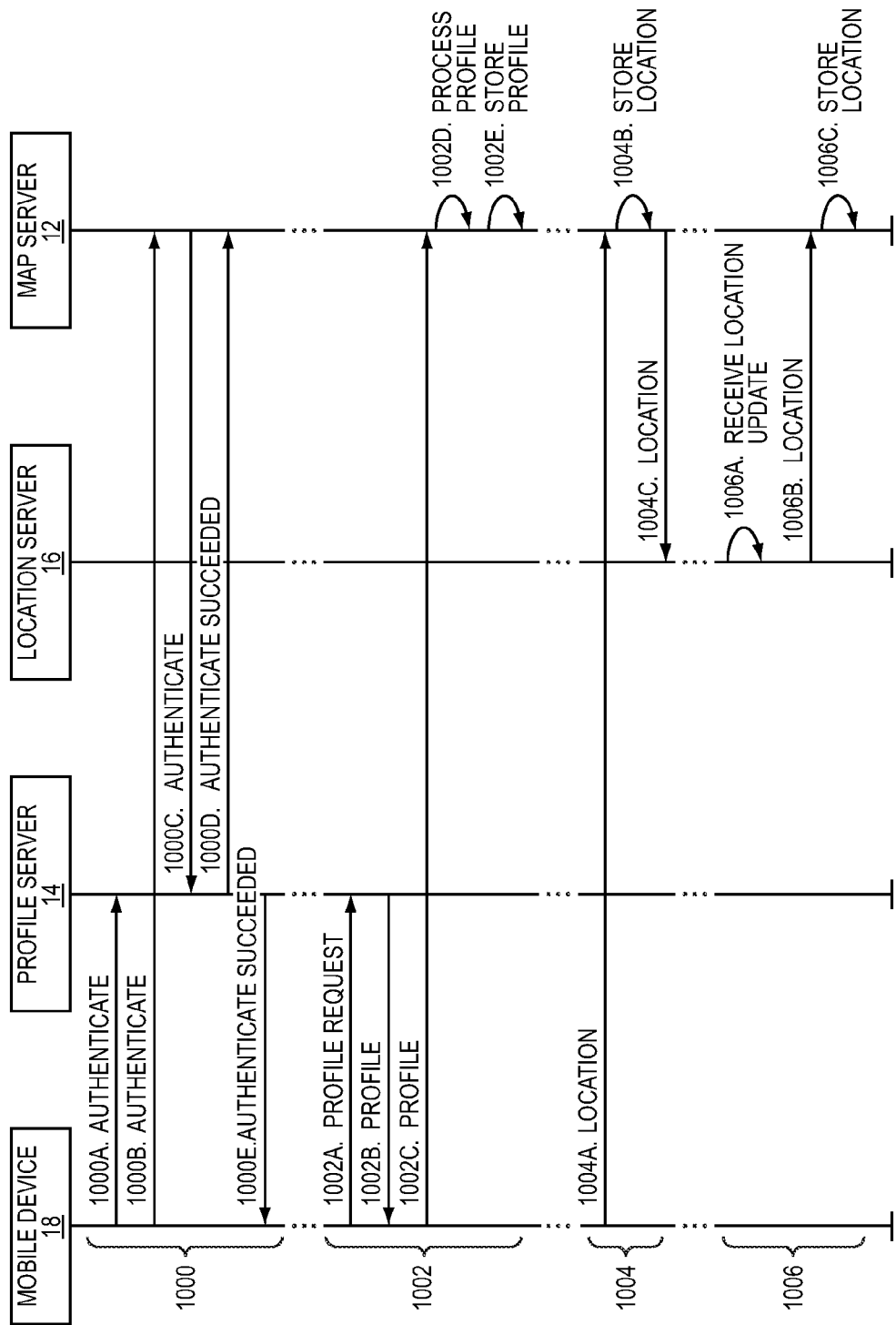
FIG. 4 illustrates the operation of the system of FIG. 1 to provide user profiles and current locations of the users of the mobile devices to the MAP server according to one embodiment of the present disclosure.

FIG. 4 illustrates the operation of the system 10 of FIG. 1 to provide the user profile of one of the users 20 of one of the mobile devices 18 to the MAP server 12 according to one embodiment of the present disclosure. This discussion is equally applicable to the other users 20 of the other mobile devices 18. First, an authentication process is performed (step 1000). For authentication, in this embodiment, the mobile device 18 authenticates with the profile server 14 (step 1000A) and the MAP server 12 (step 1000B). In addition, the MAP server 12 authenticates with the profile server 14 (step 1000C). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1000D), and the profile server 14 returns an authentication succeeded message to the MAP client 30 of the mobile device 18 (step 1000E).

At some point after authentication is complete, a user profile process is performed such that a user profile of the user 20 is obtained from the profile server 14 and delivered to the MAP server 12 (step 1002). In this embodiment, the MAP client 30 of the mobile device 18 sends a profile request to the profile server 14 (step 1002A). In response, the profile server 14 returns the user profile of the user 20 to the mobile device 18 (step 1002B). The MAP client 30 of the mobile device 18 then sends the user profile of the user 20 to the MAP server 12 (step 1002C). Note that while in this embodiment the MAP client 30 sends the complete user profile of the user 20 to the MAP server 12, in an alternative embodiment, the MAP client 30 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20 from the MAP client 30 of the mobile device 18, the profile manager 52 of the MAP server 12 processes the user profile (step 1002D). More specifically, in the preferred embodiment, the profile manager 52 includes social network handlers for the social network services supported by the MAP server 12 that operate to map the user profiles of the users 20 obtained from the social network services to a common format utilized by the MAP server 12. This common format includes a number of user profile categories, or user profile slices, such as, for example, a demographic profile category, a social interaction profile category, a general interests category, a music interests profile category, and a movie interests profile category. In addition, as discussed below, the user profiles of the users 20 maintained by the MAP server 12 include a dynamic profile slice that is automatically updated by the MAP server 12 based on real-time user-generated contexts of the users 20 (e.g., search terms entered by the users 20).

For example, if the MAP server 12 supports user profiles from Facebook®, MySpace®, and LinkedIN®, the profile manager 52 may include a Facebook handler, a MySpace handler, and a LinkedIN handler. The social network handlers process user profiles from the corresponding social network services to generate user profiles for the users 20 in the common format used by the MAP server 12. For this example assume that the user profile of the user 20 is from Facebook®. The profile manager 52 uses a Facebook handler to process the user profile of the user 20 to map the user profile of the user 20 from Facebook® to a user profile for the user 20 for the MAP server 12 that includes lists of keywords for a number of predefined profile categories, or profile slices, such as, for example, a demographic profile category, a social interaction profile category, a general interests profile category, a music interests profile category, and a movie interests profile category. As such, the user profile of the user 20 from Facebook® may be processed by the Facebook handler of the profile manager 52 to create a list of keywords such as, for example, liberal, High School Graduate, 35-44, College Graduate, etc. for the demographic profile category; a list of keywords such as Seeking Friendship for the social interaction profile category; a list of keywords such as politics, technology, photography, books, etc. for the general interests profile category; a list of keywords including music genres, artist names, album names, or the like for the music interests profile category; and a list of keywords including movie titles, actor or actress names, director names, movie genres, or the like for the movie interests profile category. In one embodiment, the profile manager 52 may use natural language processing or semantic analysis. For example, if the Facebook® user profile of the user 20 states that the user 20 is 20 years old, semantic analysis may result in the keyword of 18-24 years old being stored in the user profile of the user 20 for the MAP server 12.

After processing the user profile of the user 20, the profile manager 52 of the MAP server 12 stores the resulting user profile for the user 20 (step 1002E). More specifically, in one embodiment, the MAP server 12 stores user records for the users 20 through 20-N in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1002 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1004). In this embodiment, the MAP application 32 of the mobile device 18 obtains the current location of the mobile device 18 from the location function 36 of the mobile device 18. The MAP application 32 then provides the current location of the mobile device 18 to the MAP client 30, and the MAP client 30 then provides the current location of the mobile device 18 to the MAP server 12 (step 1004A). Note that step 1004A may be repeated periodically or in response to a change in the current location of the mobile device 18 in order for the MAP application 32 to provide location updates for the user 20 to the MAP server 12.

In response to receiving the current location of the mobile device 18, the location manager 54 of the MAP server 12 stores the current location of the mobile device 18 as the current location of the user 20 (step 1004B). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20. Any historical data maintained by the MAP server 12 is preferably anonymized by the history manager 56 in order to maintain the privacy of the users 20.

In addition to storing the current location of the user 20, the location manager 54 sends the current location of the user 20 to the location server 16 (step 1004C). In this embodiment, by providing location updates to the location server 16, the MAP server 12 in return receives location updates for the user 20 from the location server 16. This is particularly beneficial when the mobile device 18 does not permit background processes. If the mobile device 18 does not permit background processes, the MAP application 32 will not be able to provide location updates for the user 20 to the MAP server 12 unless the MAP application 32 is active. Therefore, when the MAP application 32 is not active, other applications running on the mobile device 18 (or some other device of the user 20) may directly or indirectly provide location updates to the location server 16 for the user 20. This is illustrated in step 1006 where the location server 16 receives a location update for the user 20 directly or indirectly from another application running on the mobile device 18 or an application running on another device of the user 20 (step 1006A). The location server 16 then provides the location update for the user 20 to the MAP server 12 (step 1006B). In response, the location manager 54 updates and stores the current location of the user 20 in the user record of the user 20 (step 1006C). In this manner, the MAP server 12 is enabled to obtain location updates for the user 20 even when the MAP application 32 is not active at the mobile device 18.

Figure 5:
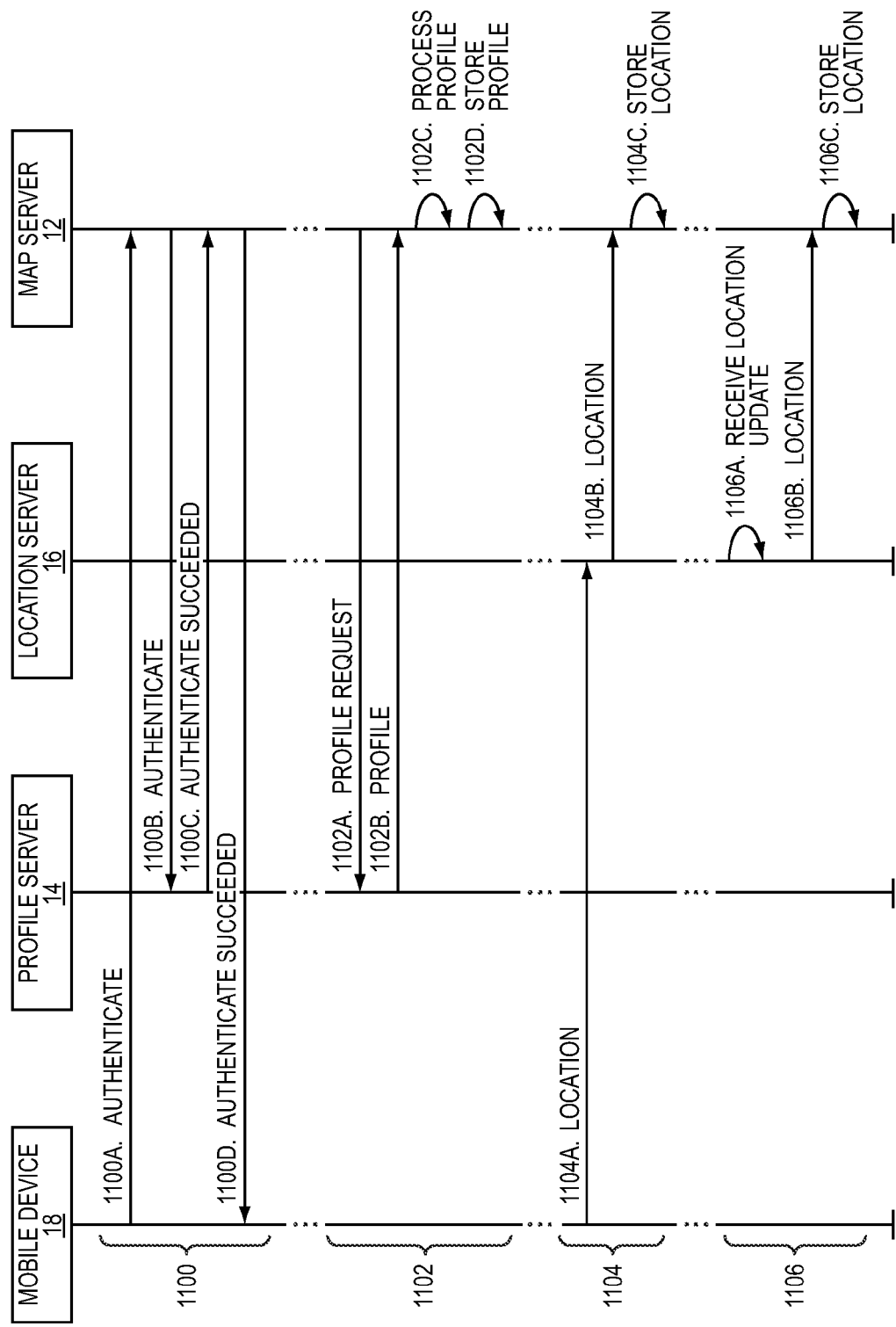
FIG. 5 illustrates the operation of the system of FIG. 1 to provide user profiles and current locations of the users of the mobile devices to the MAP server according to another embodiment of the present disclosure.

FIG. 5 illustrates the operation of the system 10 of FIG. 1 to provide the user profile of the user 20 of one of the mobile devices 18 to the MAP server 12 according to another embodiment of the present disclosure. This discussion is equally applicable to user profiles of the users 20 of the other mobile devices 18. First, an authentication process is performed (step 1100). For authentication, in this embodiment, the mobile device 18 authenticates with the MAP server 12 (step 1100A), and the MAP server 12 authenticates with the profile server 14 (step 1100B). Preferably, authentication is performed using OpenID or similar technology. However, authentication may alternatively be performed using separate credentials (e.g., username and password) of the user 20 for access to the MAP server 12 and the profile server 14. Assuming that authentication is successful, the profile server 14 returns an authentication succeeded message to the MAP server 12 (step 1100C), and the MAP server 12 returns an authentication succeeded message to the MAP client 30 of the mobile device 18 (step 1100D).

At some point after authentication is complete, a user profile process is performed such that a user profile of the user 20 is obtained from the profile server 14 and delivered to the MAP server 12 (step 1102). In this embodiment, the profile manager 52 of the MAP server 12 sends a profile request to the profile server 14 (step 1102A). In response, the profile server 14 returns the user profile of the user 20 to the profile manager 52 of the MAP server 12 (step 1102B). Note that while in this embodiment the profile server 14 returns the complete user profile of the user 20 to the MAP server 12, in an alternative embodiment, the profile server 14 may return a filtered version of the user profile of the user 20 to the MAP server 12. The profile server 14 may filter the user profile of the user 20 according to criteria specified by the user 20. For example, the user profile of the user 20 may include demographic information, general interests, music interests, and movie interests, and the user 20 may specify that the demographic information or some subset thereof is to be filtered, or removed, before sending the user profile to the MAP server 12.

Upon receiving the user profile of the user 20, the profile manager 52 of the MAP server 12 processes the user profile (step 1102C). More specifically, as discussed above, in the preferred embodiment, the profile manager 52 includes social network handlers for the social network services supported by the MAP server 12. The social network handlers process user profiles to generate user profiles for the MAP server 12 that include lists of keywords for each of a number of profile categories, or profile slices.

After processing the user profile of the user 20, the profile manager 52 of the MAP server 12 stores the resulting user profile for the user 20 (step 1102D). More specifically, in one embodiment, the MAP server 12 stores user records for the users 20 in the datastore 64 (FIG. 2). The user profile of the user 20 is stored in the user record of the user 20. The user record of the user 20 includes a unique identifier of the user 20, the user profile of the user 20, and, as discussed below, a current location of the user 20. Note that the user profile of the user 20 may be updated as desired. For example, in one embodiment, the user profile of the user 20 is updated by repeating step 1102 each time the user 20 activates the MAP application 32.

Note that while the discussion herein focuses on an embodiment where the user profiles of the users 20 are obtained from the one or more profile servers 14, the user profiles of the users 20 may be obtained in any desired manner. For example, in one alternative embodiment, the user 20 may identify one or more favorite websites. The profile manager 52 of the MAP server 12 may then crawl the one or more favorite websites of the user 20 to obtain keywords appearing in the one or more favorite websites of the user 20. These keywords may then be stored as the user profile of the user 20.

At some point, a process is performed such that a current location of the mobile device 18 and thus a current location of the user 20 is obtained by the MAP server 12 (step 1104). In this embodiment, the MAP application 32 of the mobile device 18 obtains the current location of the mobile device 18 from the location function 36 of the mobile device 18. The MAP application 32 then provides the current location of the user 20 of the mobile device 18 to the location server 16 (step 1104A). Note that step 1104A may be repeated periodically or in response to changes in the location of the mobile device 18 in order to provide location updates for the user 20 to the MAP server 12. The location server 16 then provides the current location of the user 20 to the MAP server 12 (step 1104B). The location server 16 may provide the current location of the user 20 to the MAP server 12 automatically in response to receiving the current location of the user 20 from the mobile device 18 or in response to a request from the MAP server 12.

In response to receiving the current location of the mobile device 18, the location manager 54 of the MAP server 12 stores the current location of the mobile device 18 as the current location of the user 20 (step 1104C). More specifically, in one embodiment, the current location of the user 20 is stored in the user record of the user 20 maintained in the datastore 64 of the MAP server 12. Note that, in the preferred embodiment, only the current location of the user 20 is stored in the user record of the user 20. In this manner, the MAP server 12 maintains privacy for the user 20 since the MAP server 12 does not maintain a historical record of the location of the user 20. As discussed below in detail, historical data maintained by the MAP server 12 is preferably anonymized in order to maintain the privacy of the users 20.

As discussed above, the use of the location server 16 is particularly beneficial when the mobile device 18 does not permit background processes. As such, if the mobile device 18 does not permit background processes, the MAP application 32 will not provide location updates for the user 20 to the location server 16 unless the MAP application 32 is active. However, other applications running on the mobile device 18 (or some other device of the user 20) may provide location updates to the location server 16 for the user 20 when the MAP application 32 is not active. This is illustrated in step 1106 where the location server 16 receives a location update for the user 20 from another application running on the mobile device 18 or an application running on another device of the user 20 (step 1106A). The location server 16 then provides the location update for the user 20 to the MAP server 12 (step 1106B). In response, the location manager 54 updates and stores the current location of the user 20 in the user record of the user 20 (step 1106C). In this manner, the MAP server 12 is enabled to obtain location updates for the user 20 even when the MAP application 32 is not active at the mobile device 18.

FIG. 6 begins a discussion of the operation of the crowd analyzer 58 to form crowds of users according to one embodiment of the present disclosure. Specifically, FIG. 6 is a flow chart for a spatial crowd formation process according to one embodiment of the present disclosure. Note that, in one embodiment, this process is performed in response to a request for crowd data for a POI or an AOI or in response to a crowd search request. In another embodiment, this process may be performed proactively by the crowd analyzer 58 as, for example, a background process.

First, the crowd analyzer 58 establishes a bounding box for the crowd formation process (step 1200). Note that while a bounding box is used in this example, other geographic shapes may be used to define a bounding region for the crowd formation process (e.g., a bounding circle). In one embodiment, if crowd formation is performed in response to a specific request, the bounding box is established based on the POI or the AOI of the request. If the request is for a POI, then the bounding box is a geographic area of a predetermined size centered at the POI. If the request is for an AOI, the bounding box is the AOI. Alternatively, if the crowd formation process is performed proactively, the bounding box is a bounding box of a predefined size.

The crowd analyzer 58 then creates a crowd for each individual user in the bounding box (step 1202). More specifically, the crowd analyzer 58 queries the datastore 64 of the MAP server 12 to identify users currently located within the bounding box. Then, a crowd of one user is created for each user currently located within the bounding box. Next, the crowd analyzer 58 determines the two closest crowds in the bounding box (step 1204) and determines a distance between the two crowds (step 1206). The distance between the two crowds is a distance between crowd centers of the two crowds. Note that the crowd center of a crowd of one is the current location of the user in the crowd. The crowd analyzer 58 then determines whether the distance between the two crowds is less than an optimal inclusion distance (step 1208). In this embodiment, the optimal inclusion distance is a pre-defined static distance. If the distance between the two crowds is less than the optimal inclusion distance, the crowd analyzer 58 combines the two crowds (step 1210) and computes a new crowd center for the resulting crowd (step 1212). The crowd center may be computed based on the current locations of the users in the crowd using a center of mass algorithm. At this point the process returns to step 1204 and is repeated until the distance between the two closest crowds is not less than the optimal inclusion distance. At that point, the crowd analyzer 58 discards any crowds with less than three users (step 1214). Note that throughout this disclosure crowds are only maintained if the crowds include three or more users. However, while three users is the preferred minimum number of users in a crowd, the present disclosure is not limited thereto. The minimum number of users in a crowd may be defined as any number greater than or equal to two users.

Figure 7A:
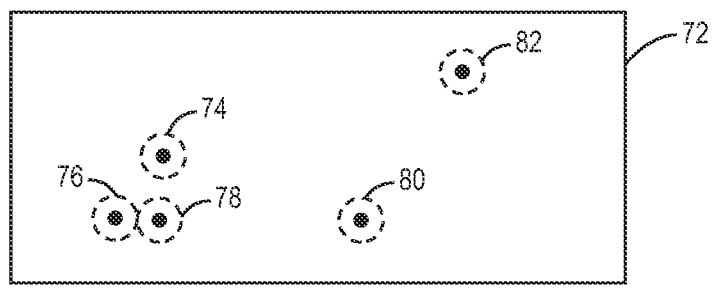
Figure 7B:
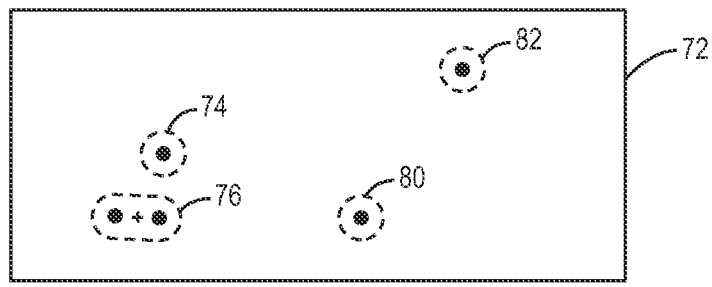
Figure 7C:
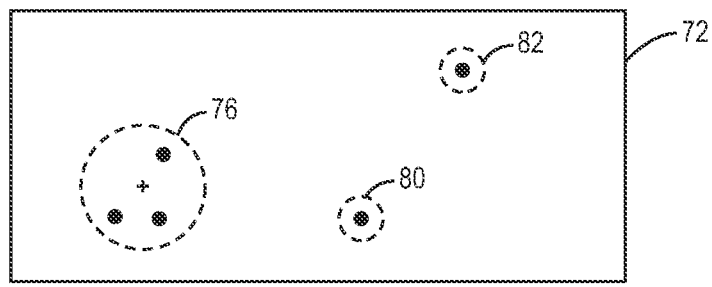
Figure 7D:
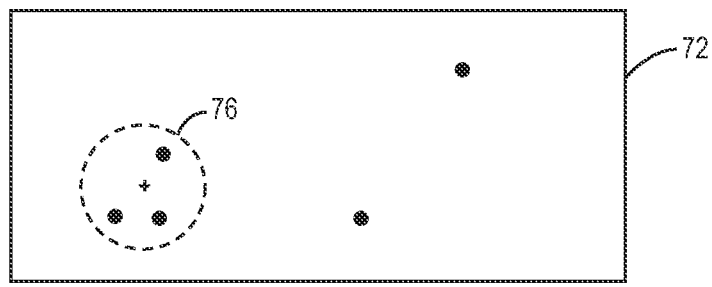

FIGS. 7A through 7D graphically illustrate the crowd formation process of FIG. 6 for an exemplary bounding box 72. In FIGS. 7A through 7D, crowds are noted by dashed circles, and the crowd centers are noted by cross-hairs (+). As illustrated in FIG. 7A, initially, the crowd analyzer 58 creates crowds 74 through 82 for the users in the geographic area defined by the bounding box 72, where, at this point, each of the crowds 74 through 82 includes one user. The current locations of the users are the crowd centers of the crowds 74 through 82. Next, the crowd analyzer 58 determines the two closest crowds and a distance between the two closest crowds. In this example, at this point, the two closest crowds are crowds 76 and 78, and the distance between the two closest crowds 76 and 78 is less than the optimal inclusion distance. As such, the two closest crowds 76 and 78 are combined by merging crowd 78 into crowd 76, and a new crowd center (+) is computed for the crowd 76, as illustrated in FIG. 7B. Next, the crowd analyzer 58 again determines the two closest crowds, which are now crowds 74 and 76. The crowd analyzer 58 then determines a distance between the crowds 74 and 76. Since the distance is less than the optimal inclusion distance, the crowd analyzer 58 combines the two crowds 74 and 76 by merging the crowd 74 into the crowd 76, and a new crowd center (+) is computed for the crowd 76, as illustrated in FIG. 7C. At this point, there are no more crowds separated by less than the optimal inclusion distance. As such, the crowd analyzer 58 discards crowds having less than three users, which in this example are crowds 80 and 82. As a result, at the end of the crowd formation process, the crowd 76 has been formed with three users, as illustrated in FIG. 7D.

FIGS. 8A through 8D illustrate a flow chart for a spatial crowd formation process according to another embodiment of the present disclosure. In this embodiment, the spatial crowd formation process is triggered in response to receiving a location update for one of the users 20 and is preferably repeated for each location update received for the users 20. As such, first, the crowd analyzer 58 receives a location update, or a new location, for a user (step 1300). Assume that, for this example, the location update is received for the user 20-1. In response, the crowd analyzer 58 retrieves an old location of the user 20-1, if any (step 1302). The old location is the current location of the user 20-1 prior to receiving the new location. The crowd analyzer 58 then creates a new bounding box of a predetermined size centered at the new location of the user 20-1 (step 1304) and an old bounding box of a predetermined size centered at the old location of the user 20-1, if any (step 1306). The predetermined size of the new and old bounding boxes may be any desired size. As one example, the predetermined size of the new and old bounding boxes is 40 meters by 40 meters. Note that if the user 20-1 does not have an old location (i.e., the location received in step 1300 is the first location received for the user 20-1), then the old bounding box is essentially null. Also note that while bounding "boxes" are used in this example, the bounding areas may be of any desired shape.

Next, the crowd analyzer 58 determines whether the new and old bounding boxes overlap (step 1308). If so, the crowd analyzer 58 creates a bounding box encompassing the new and old bounding boxes (step 1310). For example, if the new and old bounding boxes are 40×40 meter regions and a 1×1 meter square at the northeast corner of the new bounding box overlaps a 1×1 meter square at the southwest corner of the old bounding box, the crowd analyzer 58 may create a 79×79 meter square bounding box encompassing both the new and old bounding boxes.

The crowd analyzer 58 then determines the individual users and crowds relevant to the bounding box created in step 1310 (step 1312). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 58 computes an optimal inclusion distance for individual users based on user density within the bounding box (step 1314). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}}, \quad \text{Eqn. (1)}$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔.

The crowd analyzer 58 then creates a crowd for each individual user within the bounding box that is not already included in a crowd and sets the optimal inclusion distance for the crowds to the initial optimal inclusion distance (step 1316). At this point, the process proceeds to FIG. 8B where the crowd analyzer 58 analyzes the crowds relevant to the bounding box to determine whether any of the crowd members (i.e., users in the crowds) violate the optimal inclusion distance of their crowds (step 1318). Any crowd member that violates the optimal inclusion distance of his or her crowd is then removed from that crowd (step 1320). The crowd analyzer 58 then creates a crowd of one user for each of the users removed from their crowds in step 1320 and sets the optimal inclusion distance for the newly created crowds to the initial optimal inclusion distance (step 1322).

Next, the crowd analyzer 58 determines the two closest crowds for the bounding box (step 1324) and a distance between the two closest crowds (step 1326). The distance between the two closest crowds is the distance between the crowd centers of the two closest crowds. The crowd analyzer 58 then determines whether the distance between the two closest crowds is less than the optimal inclusion distance of a larger of the two closest crowds (step 1328). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 58 determines whether the distance between the two closest crowds is less than the optimal inclusion distances of both of the two closest crowds. As another alternative, if the two closest crowds are of the same size, the crowd analyzer 58 may compare the distance between the two closest crowds to an average of the optimal inclusion distances of the two closest crowds.

If the distance between the two closest crowds is less than the optimal inclusion distance, the two closest crowds are combined or merged (step 1330), and a new crowd center for the resulting crowd is computed (step 1332). Again, a center of mass algorithm may be used to compute the crowd center of a crowd. In addition, a new optimal inclusion distance for the resulting crowd is computed (step 1334). In one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right), \quad \text{Eqn. (2)}$$

$$\text{optimial\_inclusion\_dist} = \text{average} + \sqrt{\left( \frac{1}{n} \cdot \sum_{i=1}^{n} (d_i - \text{average})^2 \right)} \quad \text{Eqn. (3)}$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 58 determines whether a maximum number of iterations have been performed (step 1336). The maximum number of iterations is a predefined number that ensures that the crowd formation process does not indefinitely loop over steps 1318 through 1334 or loop over steps 1318 through 1334 more than a desired maximum number of times. If the maximum number of iterations has not been reached, the process returns to step 1318 and is repeated until either the distance between the two closest crowds is not less than the optimal inclusion distance of the larger crowd or the maximum number of iterations has been reached. At that point, the crowd analyzer 58 discards crowds with less than three users, or members (step 1338) and the process ends.

Figure 8A:
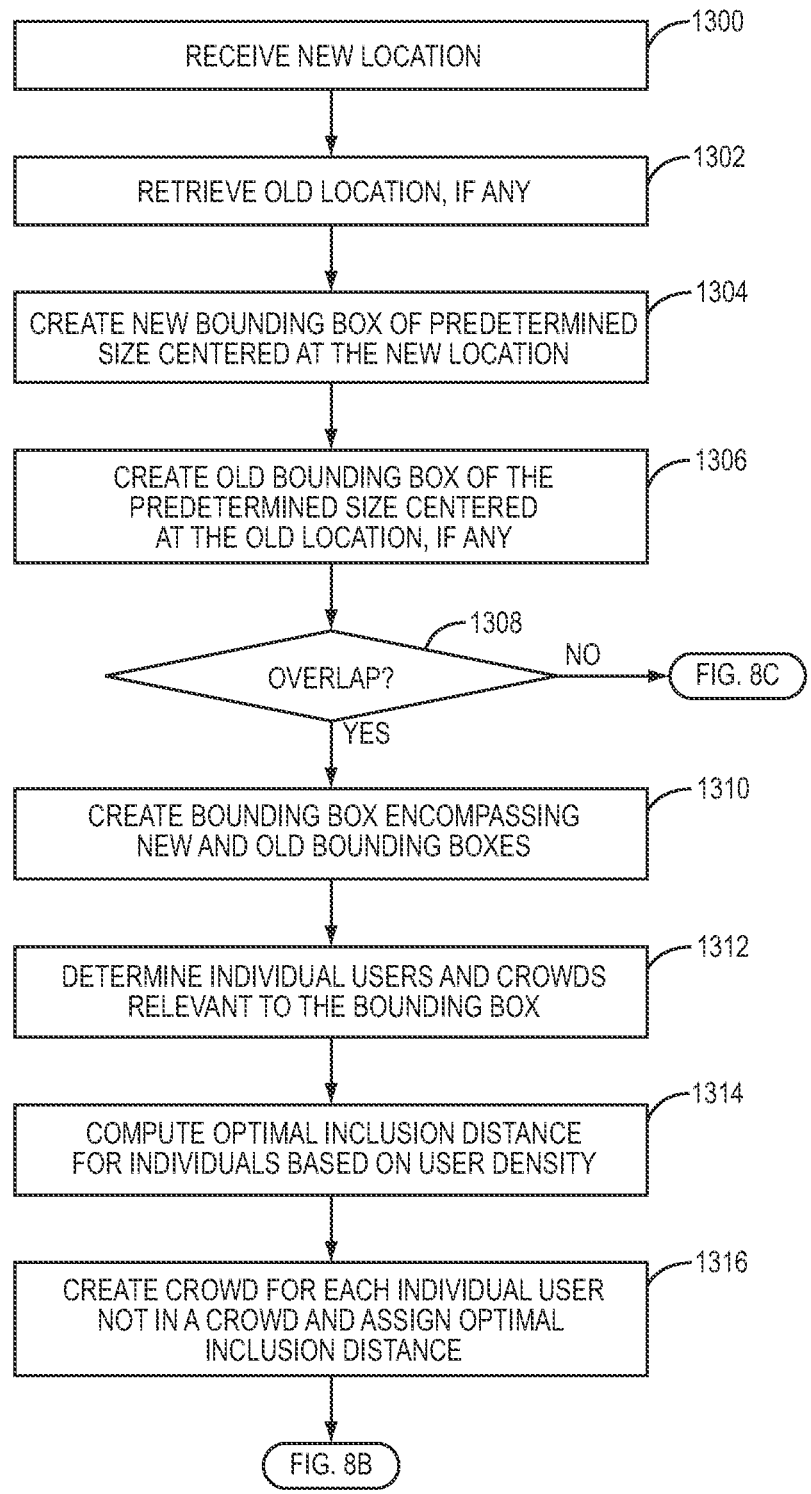
Figure 8B:
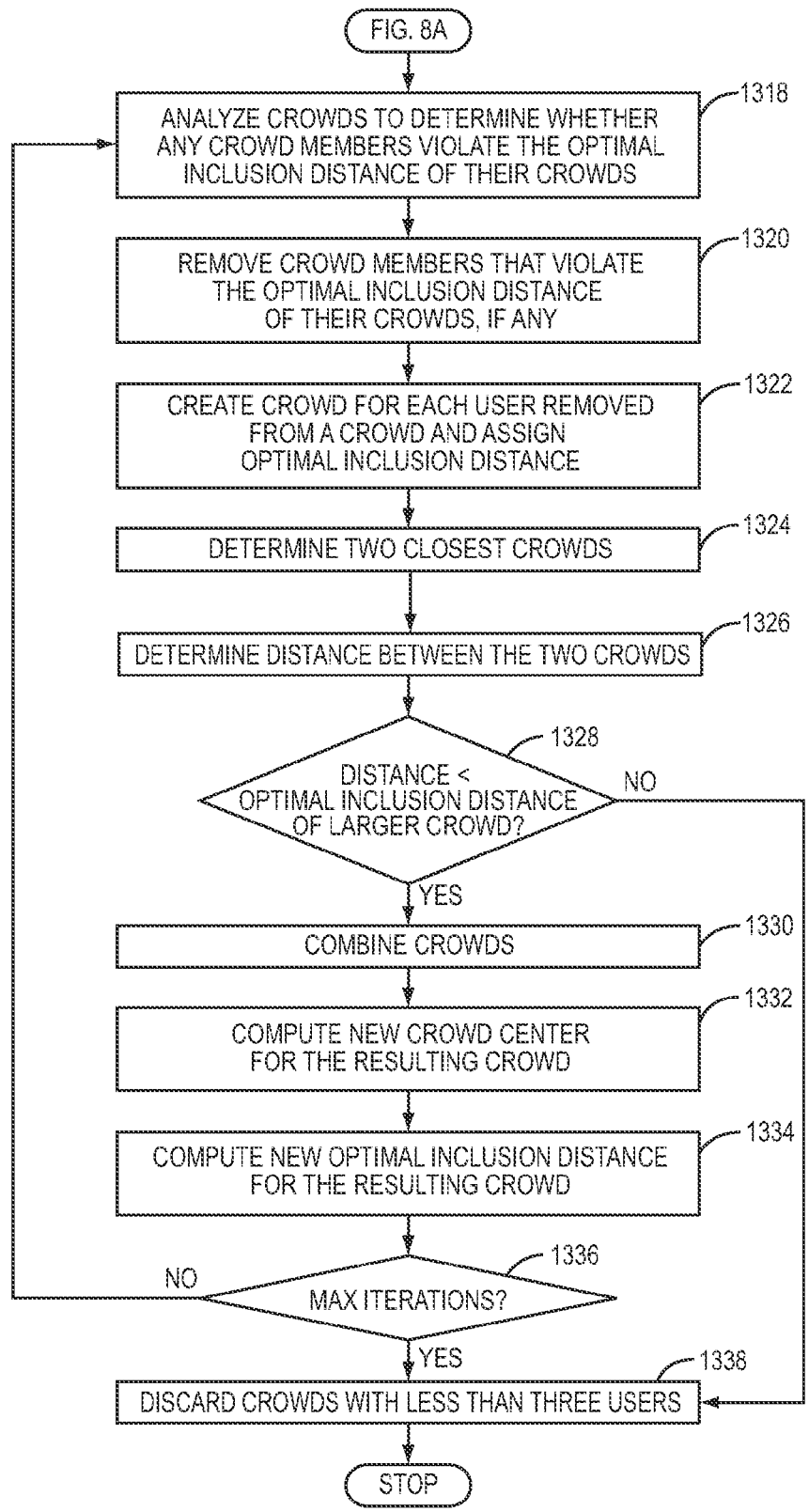
Figure 8C:
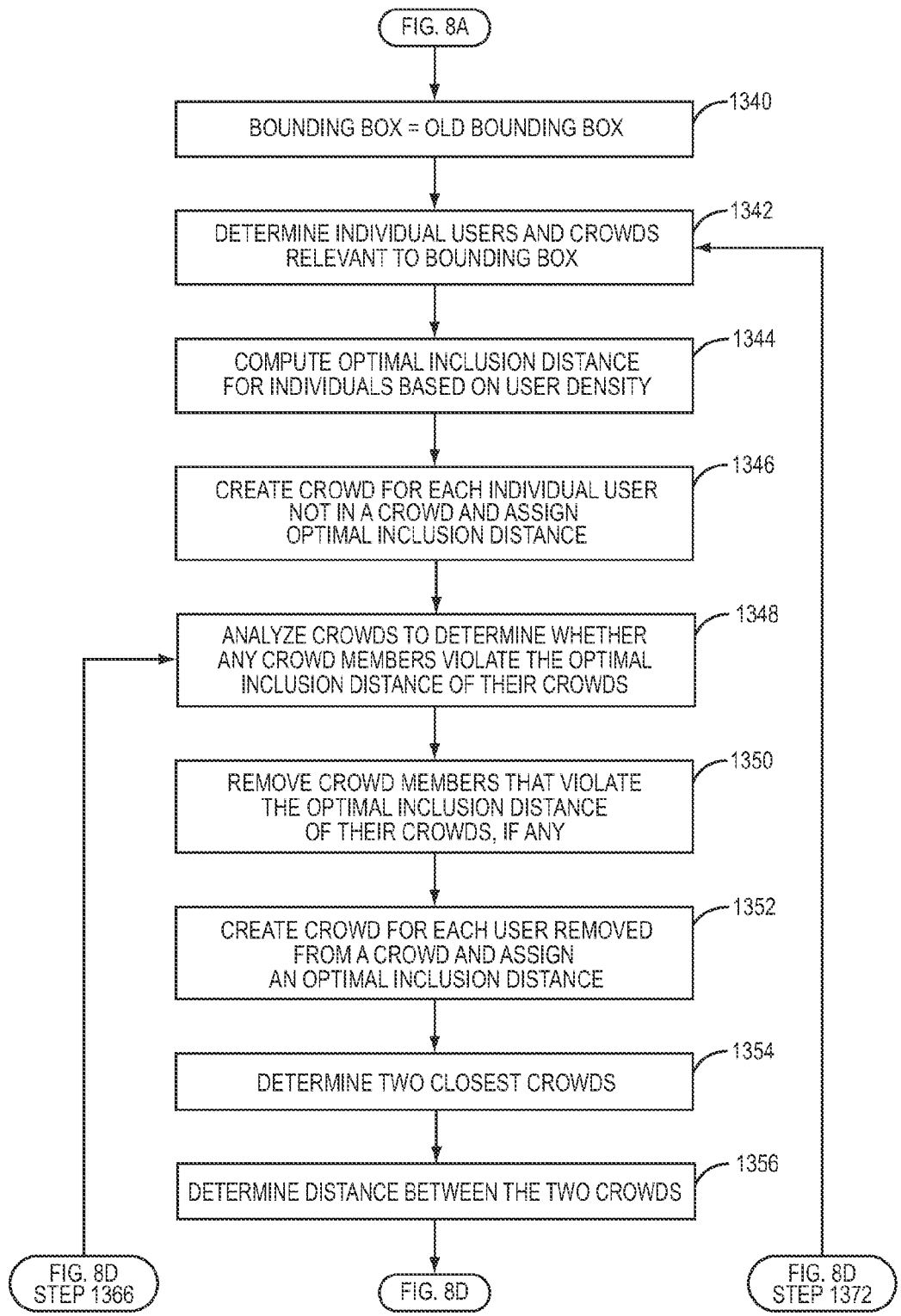
Figure 8D:
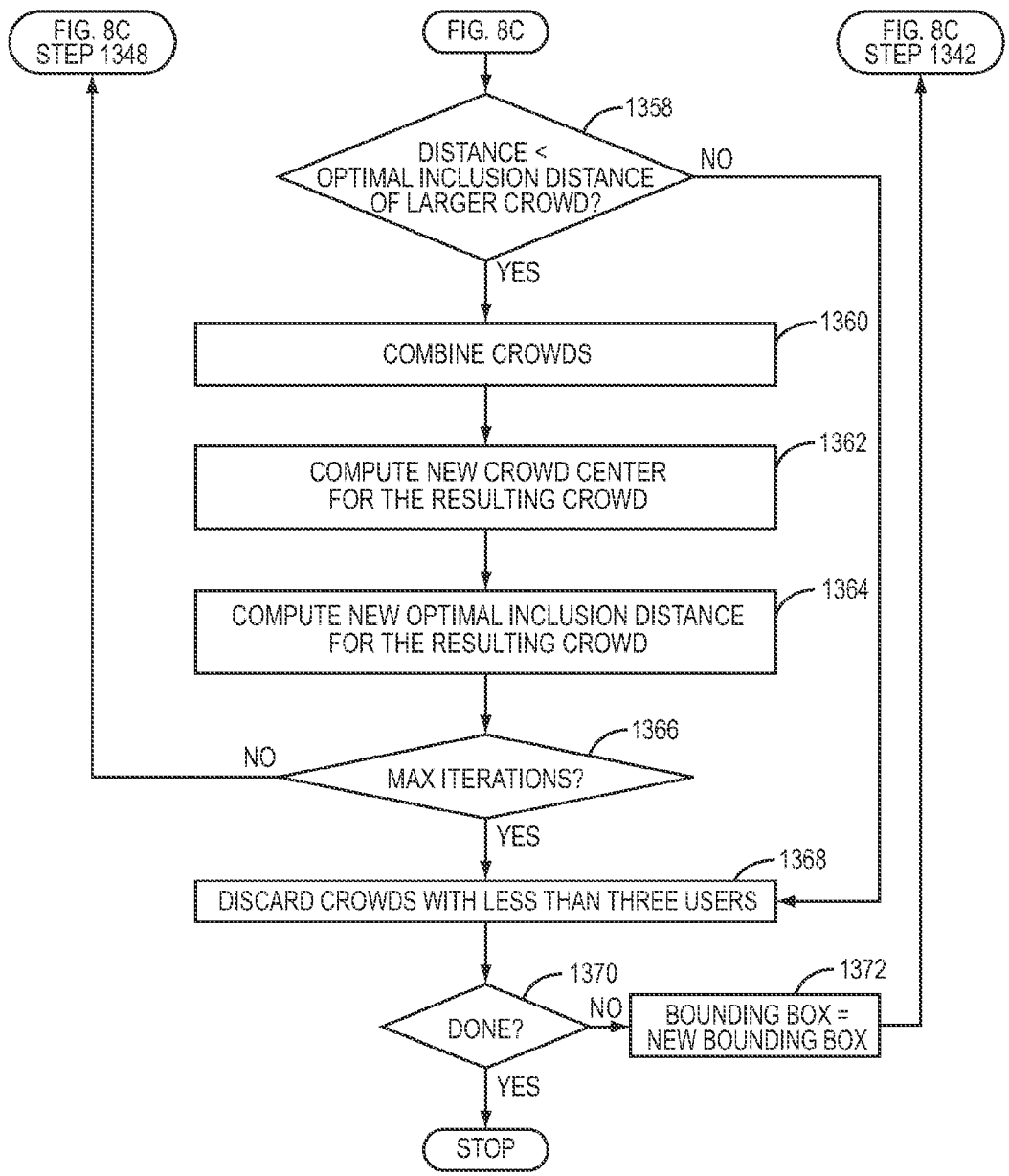

Returning to step 1308 in FIG. 8A, if the new and old bounding boxes do not overlap, the process proceeds to FIG. 8C and the bounding box to be processed is set to the old bounding box (step 1340). In general, the crowd analyzer 58 then processes the old bounding box in much the same manner as described above with respect to steps 1312 through 1338. More specifically, the crowd analyzer 58 determines the individual users and crowds relevant to the bounding box (step 1342). The crowds relevant to the bounding box are crowds that are within or overlap the bounding box (e.g., have at least one user located within the bounding box). The individual users relevant to the bounding box are users that are currently located within the bounding box and not already part of a crowd. Next, the crowd analyzer 58 computes an optimal inclusion distance for individual users based on user density within the bounding box (step 1344). More specifically, in one embodiment, the optimal inclusion distance for individuals, which is also referred to herein as an initial optimal inclusion distance, is set according to the following equation:

$$\text{initial\_optimal\_inclusion\_dist} = a \cdot \sqrt{\frac{A_{BoundingBox}}{\text{number\_of\_users}}}, \quad \text{Eqn. (4)}$$

where a is a number between 0 and 1, $A_{BoundingBox}$ is an area of the bounding box, and number_of_users is the total number of users in the bounding box. The total number of users in the bounding box includes both individual users that are not already in a crowd and users that are already in a crowd. In one embodiment, a is ⅔.

The crowd analyzer 58 then creates a crowd of one user for each individual user within the bounding box that is not already included in a crowd and sets the optimal inclusion distance for the crowds to the initial optimal inclusion distance (step 1346). At this point, the crowd analyzer 58 analyzes the crowds for the bounding box to determine whether any crowd members (i.e., users in the crowds) violate the optimal inclusion distance of their crowds (step 1348). Any crowd member that violates the optimal inclusion distance of his or her crowd is then removed from that crowd (step 1350). The crowd analyzer 58 then creates a crowd of one user for each of the users removed from their crowds in step 1350 and sets the optimal inclusion distance for the newly created crowds to the initial optimal inclusion distance (step 1352).

Next, the crowd analyzer 58 determines the two closest crowds in the bounding box (step 1354) and a distance between the two closest crowds (step 1356). The distance between the two closest crowds is the distance between the crowd centers of the two closest crowds. The crowd analyzer 58 then determines whether the distance between the two closest crowds is less than the optimal inclusion distance of a larger of the two closest crowds (step 1358). If the two closest crowds are of the same size (i.e., have the same number of users), then the optimal inclusion distance of either of the two closest crowds may be used. Alternatively, if the two closest crowds are of the same size, the optimal inclusion distances of both of the two closest crowds may be used such that the crowd analyzer 58 determines whether the distance between the two closest crowds is less than the optimal inclusion distances of both of the two closest crowds. As another alternative, if the two closest crowds are of the same size, the crowd analyzer 58 may compare the distance between the two closest crowds to an average of the optimal inclusion distances of the two closest crowds.

If the distance between the two closest crowds is less than the optimal inclusion distance, the two closest crowds are combined or merged (step 1360), and a new crowd center for the resulting crowd is computed (step 1362). Again, a center of mass algorithm may be used to compute the crowd center of a crowd. In addition, a new optimal inclusion distance for the resulting crowd is computed (step 1364). As discussed above, in one embodiment, the new optimal inclusion distance for the resulting crowd is computed as:

$$\text{average} = \frac{1}{n+1} \cdot \left( \text{initial\_optimal\_inclusion\_dist} + \sum_{i=1}^{n} d_i \right), \quad \text{Eqn. (5)}$$

$$\text{optimal\_inclusion\_dist} = \text{average} + \sqrt{\left( \frac{1}{n} \cdot \sum_{i=1}^{n} (d_i - \text{average})^2 \right)} \quad \text{Eqn. (6)}$$

where n is the number of users in the crowd and $d_i$ is a distance between the ith user and the crowd center. In other words, the new optimal inclusion distance is computed as the average of the initial optimal inclusion distance and the distances between the users in the crowd and the crowd center plus one standard deviation.

At this point, the crowd analyzer 58 determines whether a maximum number of iterations have been performed (step 1366). If the maximum number of iterations has not been reached, the process returns to step 1348 and is repeated until either the distance between the two closest crowds is not less than the optimal inclusion distance of the larger crowd or the maximum number of iterations has been reached. At that point, the crowd analyzer 58 discards crowds with less than three users, or members (step 1368). The crowd analyzer 58 then determines whether the crowd formation process for the new and old bounding boxes is done (step 1370). In other words, the crowd analyzer 58 determines whether both the new and old bounding boxes have been processed. If not, the bounding box is set to the new bounding box (step 1372), and the process returns to step 1342 and is repeated for the new bounding box. Once both the new and old bounding boxes have been processed, the crowd formation process ends.

Figure 9A:
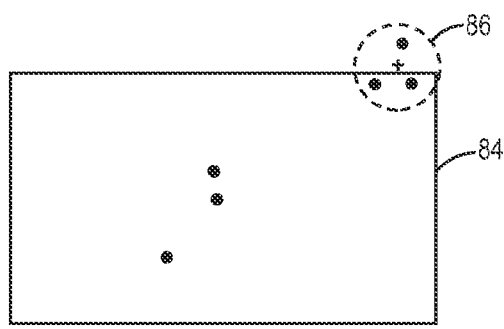
Figure 9B:
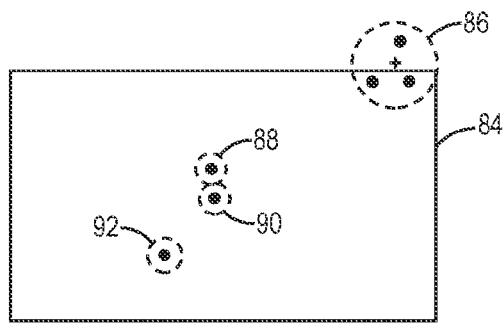

FIGS. 9A through 9D graphically illustrate the crowd formation process of FIGS. 8A through 8D for a scenario where the crowd formation process is triggered by a location update for a user having no old location. In this scenario, the crowd analyzer 58 creates a new bounding box 84 for the new location of the user, and the new bounding box 84 is set as the bounding box to be processed for crowd formation. Then, as illustrated in FIG. 9A, the crowd analyzer 58 identifies all individual users currently located within the new bounding box 84 and all crowds located within or overlapping the new bounding box 84. In this example, crowd 86 is an existing crowd relevant to the new bounding box 84. Crowds are indicated by dashed circles, crowd centers are indicated by cross-hairs (+), and users are indicated as dots. Next, as illustrated in FIG. 9B, the crowd analyzer 58 creates crowds 88 through 92 of one user for the individual users, and the optional inclusion distances of the crowds 88 through 92 are set to the initial optimal inclusion distance. As discussed above, the initial optimal inclusion distance is computed by the crowd analyzer 58 based on a density of users within the new bounding box 84.

Figure 9C:
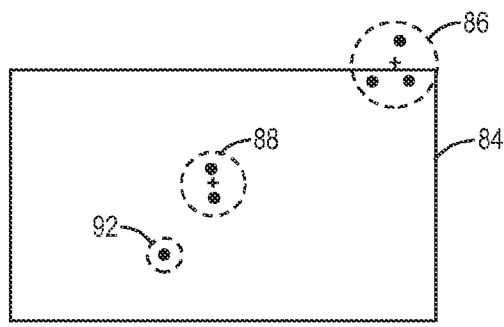
Figure 9D:
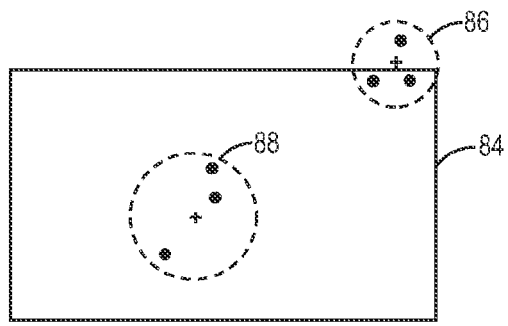

The crowd analyzer 58 then identifies the two closest crowds 88 and 90 in the new bounding box 84 and determines a distance between the two closest crowds 88 and 90. In this example, the distance between the two closest crowds 88 and 90 is less than the optimal inclusion distance. As such, the two closest crowds 88 and 90 are merged and a new crowd center and new optimal inclusion distance are computed, as illustrated in FIG. 9C. The crowd analyzer 58 then repeats the process such that the two closest crowds 88 and 92 in the new bounding box 84 are again merged, as illustrated in FIG. 9D. At this point, the distance between the two closest crowds 86 and 88 is greater than the appropriate optimal inclusion distance. As such, the crowd formation process is complete.

Figure 10A:
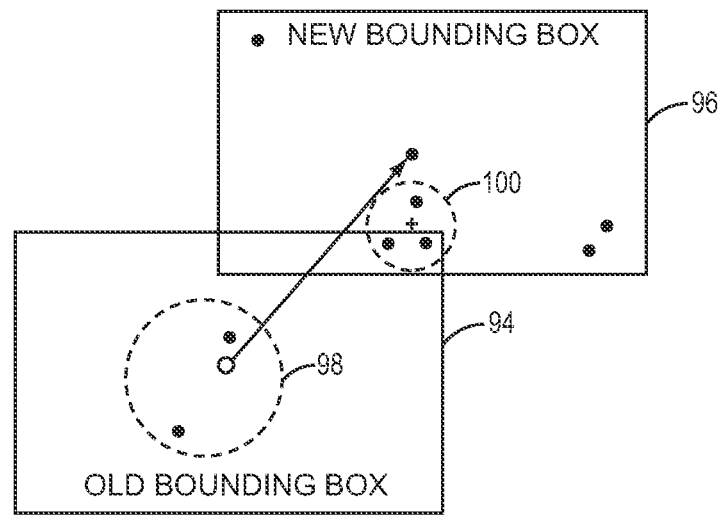

FIGS. 10A through 10F graphically illustrate the crowd formation process of FIGS. 8A through 8D for a scenario where the new and old bounding boxes overlap. As illustrated in FIG. 10A, a user moves from an old location to a new location, as indicated by an arrow. The crowd analyzer 58 receives a location update for the user giving the new location of the user. In response, the crowd analyzer 58 creates an old bounding box 94 for the old location of the user and a new bounding box 96 for the new location of the user. Crowd 98 exists in the old bounding box 94, and crowd 100 exists in the new bounding box 96.

Figure 10B:
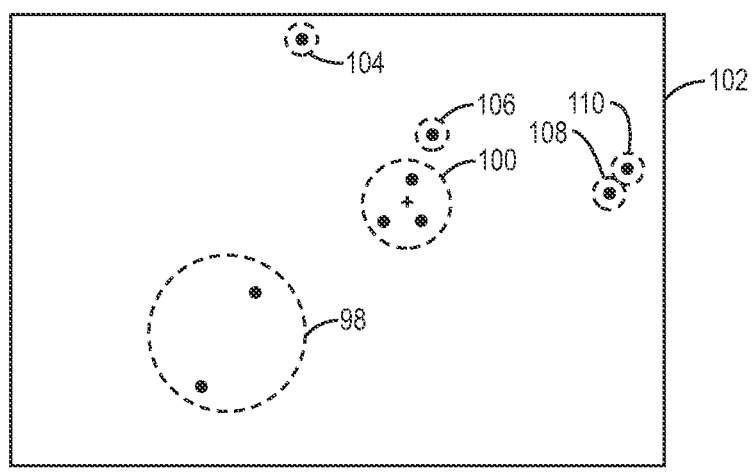

Since the old bounding box 94 and the new bounding box 96 overlap, the crowd analyzer 58 creates a bounding box 102 that encompasses both the old bounding box 94 and the new bounding box 96, as illustrated in FIG. 10B. In addition, the crowd analyzer 58 creates crowds 104 through 110 for individual users currently located within the bounding box 102. The optimal inclusion distances of the crowds 104 through 110 are set to the initial optimal inclusion distance computed by the crowd analyzer 58 based on the density of users in the bounding box 102.

Figure 10C:
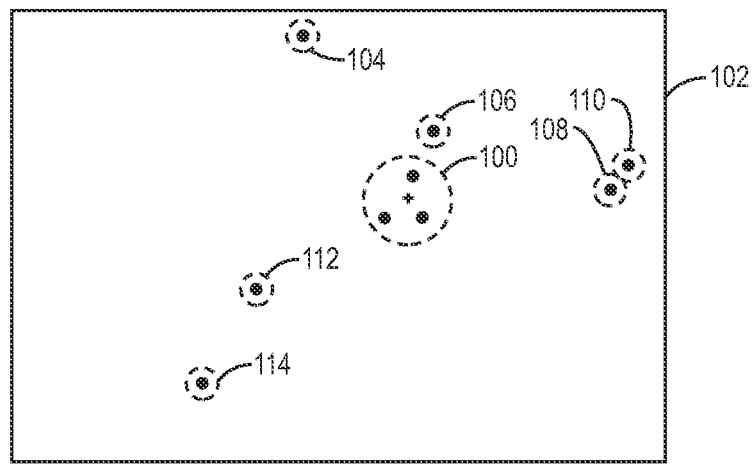

Next, the crowd analyzer 58 analyzes the crowds 98, 100, and 104 through 110 to determine whether any members of the crowds 98, 100, and 104 through 110 violate the optimal inclusion distances of the crowds 98, 100, and 104 through 110. In this example, as a result of the user leaving the crowd 98 and moving to his new location, both of the remaining members of the crowd 98 violate the optimal inclusion distance of the crowd 98. As such, the crowd analyzer 58 removes the remaining users from the crowd 98 and creates crowds 112 and 114 of one user each for those users, as illustrated in FIG. 10C.

Figure 10D:
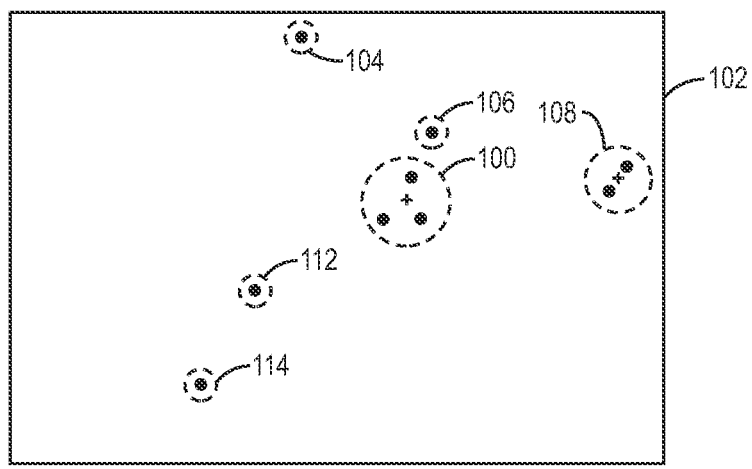

The crowd analyzer 58 then identifies the two closest crowds in the bounding box 102, which in this example are the crowds 108 and 110. Next, the crowd analyzer 58 computes a distance between the two crowds 108 and 110. In this example, the distance between the two crowds 108 and 110 is less than the initial optimal inclusion distance and, as such, the two crowds 108 and 110 are combined. In this example, crowds are combined by merging the smaller crowd into the larger crowd. Since the two crowds 108 and 110 are of the same size, the crowd analyzer 58 merges the crowd 110 into the crowd 108, as illustrated in FIG. 10D. A new crowd center and new optimal inclusion distance are then computed for the crowd 108.

Figure 10E:
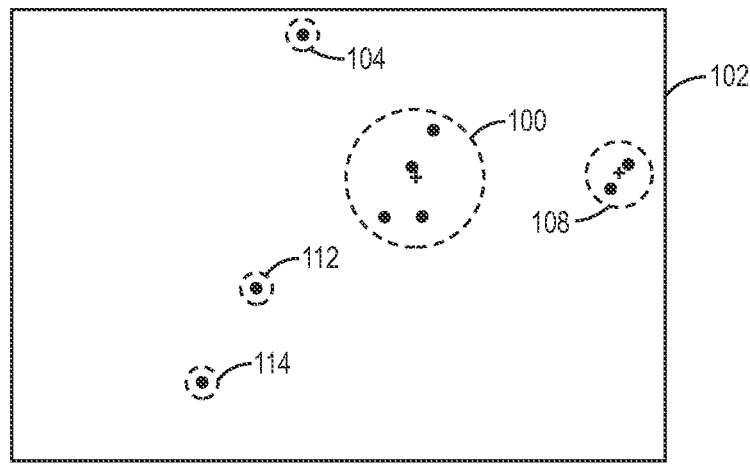
Figure 10F:
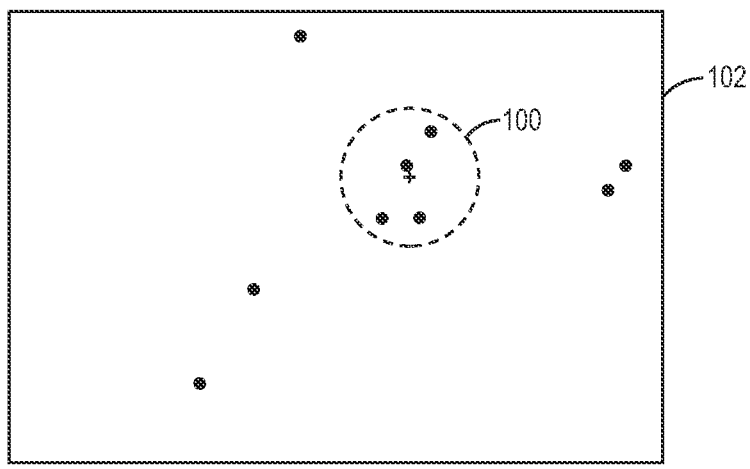

At this point, the crowd analyzer 58 repeats the process and determines that the crowds 100 and 106 are now the two closest crowds. In this example, the distance between the two crowds 100 and 106 is less than the optimal inclusion distance of the larger of the two crowds 100 and 106, which is the crowd 100. As such, the crowd 106 is merged into the crowd 100 and a new crowd center and optimal inclusion distance are computed for the crowd 100, as illustrated in FIG. 10E. At this point, there are no two crowds closer than the optimal inclusion distance of the larger of the two crowds. As such, the crowd analyzer 58 discards any crowds having less than three members, as illustrated in FIG. 10F. In this example, the crowds 104, 108, 112, and 114 have less than three members and are therefore removed. The crowd 100 has three or more members and, as such, is not removed. At this point, the crowd formation process is complete.

Figure 11A:
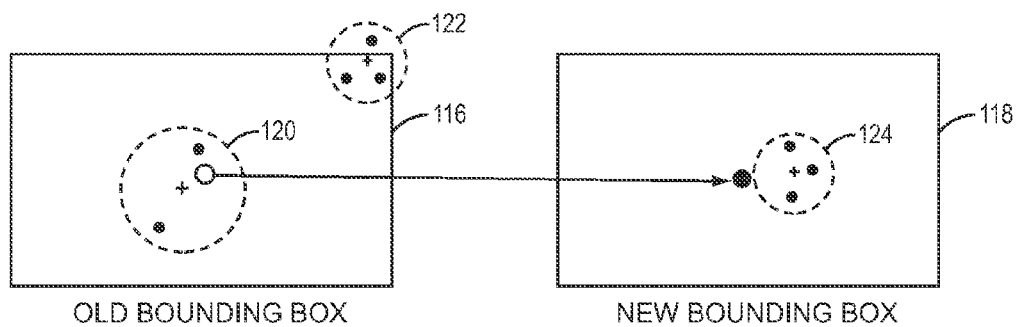

FIGS. 11A through 11E graphically illustrate the crowd formation process of FIGS. 8A through 8D in a scenario where the new and old bounding boxes do not overlap. As illustrated in FIG. 11A, in this example, the user moves from an old location to a new location. The crowd analyzer 58 creates an old bounding box 116 for the old location of the user and a new bounding box 118 for the new location of the user. Crowds 120 and 122 exist in the old bounding box 116, and crowd 124 exists in the new bounding box 118. In this example, since the old and new bounding boxes 116 and 118 do not overlap, the crowd analyzer 58 processes the old and new bounding boxes 116 and 118 separately.

Figure 11B:
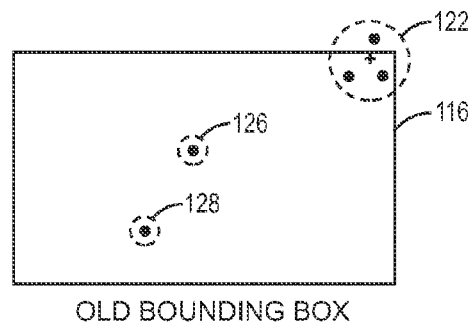
Figure 11C:
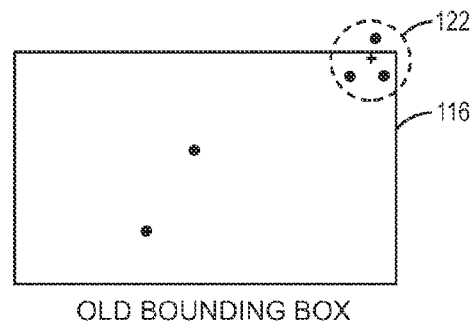

More specifically, as illustrated in FIG. 11B, as a result of the movement of the user from the old location to the new location, the remaining users in the crowd 120 no longer satisfy the optimal inclusion distance for the crowd 120. As such, the remaining users in the crowd 120 are removed from the crowd 120, and crowds 126 and 128 of one user each are created for the removed users. In this example, no two crowds in the old bounding box 116 are close enough to be combined. As such, the crowd analyzer 58 discards any crowds having less than three members, as illustrated in FIG. 11C, and processing of the old bounding box 116 is complete. The crowd analyzer 58 then proceeds to process the new bounding box 118.

Figure 11D:
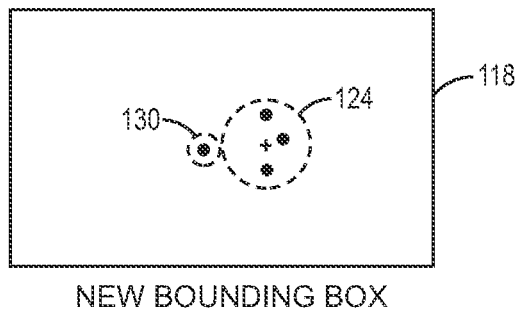
Figure 11E:
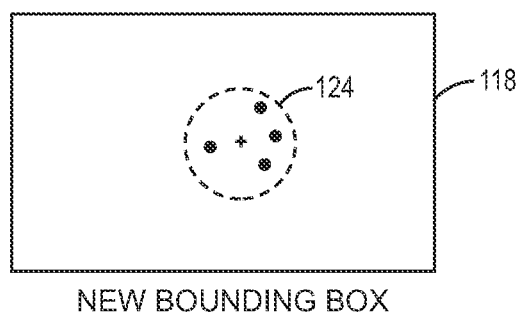

As illustrated in FIG. 11D, processing of the new bounding box 118 begins by the crowd analyzer 58 creating a crowd 130 of one user for the user. The crowd analyzer 58 then identifies the crowds 124 and 130 as the two closest crowds in the new bounding box 118 and determines a distance between the two crowds 124 and 130. In this example, the distance between the two crowds 124 and 130 is less than the optimal inclusion distance of the larger crowd, which is the crowd 124. As such, the crowd analyzer 58 combines the crowds 124 and 130 by merging the crowd 130 into the crowd 124, as illustrated in FIG. 11E. A new crowd center and new optimal inclusion distance are then computed for the crowd 124. At this point, the crowd formation process is complete. Note that the crowd formation processes described above with respect to FIGS. 6 through 11D are exemplary. The present disclosure is not limited thereto. Any type of crowd formation process may be used.

FIG. 12 illustrates the operation of the system 10 to provide a crowd search feature according to one embodiment of the present disclosure. Note that while this example is directed to an embodiment where the crowd search is initiated by one of the users 20, the system 10 may additionally or alternatively enable other users or services such as the subscriber 24 or the third-party service 26 to initiate a crowd search. As illustrated, in this example, the MAP application 32-1 of the mobile device 18-1 of the user 20-1 sends a crowd search request to the MAP client 30-1 (step 1400), which in turn sends the crowd search request to the MAP server 12 (step 1402). The crowd search request is preferably initiated by the user 20-1 of the mobile device 18-1 by providing corresponding user input to a crowd search feature of the MAP application 32-1. The crowd search request includes one or more keywords, or search terms. The keywords, or search terms, in the crowd request may be manually entered by the user 20-1. In order to assist the user 20-1, one or more keywords may be recommended to the user 20-1. For example, the MAP server 12 may monitor keywords entered by the users 20 in crowd searches to track the most popular keywords, keywords that are trending now (e.g., the most popular keywords used in crowd searches over the last 24 hours), or the like. The MAP server 12 may then recommend those keywords, or some select subset thereof, to the user 20-1. In addition or alternatively, the MAP server 12 may utilize other third-party sources to obtain popular or trending topics to recommend to the user 20-1. For example, the MAP server 12 may obtain trending topics or keywords from a third-party microblog service such as Twitter®, an Internet search engine such as Google® or Yahoo!®, or the like.

In addition to search terms, the crowd search request may include a POI or AOI for the crowd search request. Note that the POI or AOI for the crowd search request may be the current location of the user 20-1 or a geographic region of a predetermined shape and size centered at or otherwise encompassing the current location of the user 20-1. Alternatively, the POI or AOI for the crowd search request may be a POI or AOI selected by the user 20-1. For example, the user 20-1 may be enabled to select a desired POI or AOI from a map, select a desired POI or AOI from a predefined list of POIs and/or AOIs, or the like.

In response to receiving the crowd search request, the MAP server 12 updates the dynamic profile slice of the user 20-1, which is also referred to as the requesting user (step 1404). As discussed below in detail, the search terms, or keywords, included in the crowd search request are added to the dynamic profile slice of the user 20-1. In addition, the time at which the crowd search request is received by the MAP server 12 or sent by the mobile device 18-1 and/or the current location of the user 20-1 at the time at which the crowd search request is received by the MAP server 12 or sent by the mobile device 18-1 are preferably stored in association with the keywords in the dynamic profile slice of the user 20-1. In this manner, as the user 20-1 initiates new crowd search requests over time, the search terms, or keywords, included in the crowd search requests are accumulated in the dynamic profile slice of the user 20-1. As a result, the dynamic profile slice of the user 20-1 is automatically updated and operates to reflect the dynamic, or changing, interests of the user 20-1 over time and/or location.

In addition to updating the dynamic profile slice of the user 20-1, the MAP sever 12, and specifically the crowd analyzer 58, identifies one or more crowds that satisfy the crowd search request (step 1406). As discussed below in detail, the one or more crowds that satisfy the crowd search request are crowds that include users with user profiles that match the search terms, or keywords, included in the crowd search request. The MAP server 12 then returns results of the crowd search to the MAP client 30-1 of the mobile device 18-1 (step 1408), which in turn sends the results to the MAP application 32-1 (step 1410) where the results are presented to the user 20-1 (step 1412). The results of the crowd search generally include crowd data for each of the one or more crowds identified as matching the crowd search request. Preferably, the crowd data includes the current locations of the one or more crowds (e.g., the crowd centers of the one or more crowds). In addition, the crowd data may include aggregate profiles of the crowds based on a comparison of the user profiles of the users in the crowds to one another or to the search terms.

FIG. 13 illustrates step 1404 of FIG. 12 in more detail according to one embodiment of the present disclosure. In response to the crowd search request received from the mobile device 18-1 of the user 20-1, the MAP server 12, and more specifically the profile manager 52 of the MAP server 12, first gets a first keyword from the crowd search request (step 1500). The profile manager 52 then determines whether a matching keyword already exists in the dynamic profile slice of the user profile of the user 20-1 (step 1502). As used herein, a keyword in the crowd search request and a keyword in the dynamic profile slice are matching keywords if the two keywords match at least to a predetermined threshold degree. For example, two keywords may be determined to match if the two keywords exactly match. As another example, two keywords may be determined to match if the two keywords are determined to be the same or highly related in an ontology or using natural language processing. For example, the keyword "NC State" may be determined to match a keyword "NCSU" even though the two keywords are not exactly the same.

If a matching keyword is not already in the dynamic profile slice of the user profile of the user 20-1, the profile manager 52 adds the keyword from the crowd search request to the dynamic profile slice of the user profile of the user 20-1 (step 1504). In this embodiment, the profile manager 52 also adds a timestamp and location stamp for the keyword to the dynamic profile slice of the user profile of the user 20-1 (step 1506). The timestamp is the time at which the crowd search request was received by the MAP server 12. The location stamp is the current location of the user 20-1 at the time at which the crowd search request was received by the MAP server 12. Returning to step 1502, if a matching keyword does exist in the dynamic profile slice of the user profile of the user 20-1, the profile manager 52 proceeds to step 1506 in order to add a timestamp and location stamp for the matching keyword in the dynamic profile slice of the user profile of the user 20-1. Using the process of FIG. 13, the dynamic profile slice of the user profile of the user 20-1 includes an accumulated list of keywords from crowd search requests issued by the user 20-1. In addition, for each keyword in the accumulated list of keywords, the dynamic profile slice includes either the timestamp and location stamp for the most recent occurrence of the keyword in a crowd search request from the user 20-1 or a list of timestamps and location stamps for a number of previous occurrences of the keyword in previous crowd search requests from the user 20-1.

FIG. 14 illustrates step 1406 of FIG. 12 in more detail according to one embodiment of the present disclosure. In order to identify the one or more crowds that satisfy the crowd search request, the crowd analyzer 58 of the MAP server 12 first creates a bounding region for the crowd search request (step 1600). In one embodiment, the crowd search request includes a POI, and the bounding region for the crowd search request is a bounding region of a predefined geographic shape and size that is centered at or that otherwise encompasses the POI. In another embodiment, the crowd search request includes an AOI, and the bounding region for the crowd search request is set to the AOI. In yet another embodiment, the crowd search request does not include a POI or an AOI in which case the bounding region is a geographic region of a predefined shape and size that is centered at or that otherwise encompasses the current location of the user 20-1.

Next, the crowd analyzer 58 identifies one or more crowds that are relevant to the bounding region for the crowd search request (step 1602). The one or more crowds relevant to the bounding region are one or more crowds that are located within or that overlap the bounding region. For example, the one or more crowds may be one or more crowds having crowd centers located within the bounding region, one or more crowds having at least one user located within the bounding region, one or more crowds having crowd perimeters that are within or overlap the bounding region, or the like. Then, for each relevant crowd identified in step 1602, the crowd analyzer 58 obtains an aggregate profile for the relevant crowd, where the aggregate profile is based on a comparison of the user profiles of the users 20 in the crowd to one another (step 1604). In one embodiment, the aggregate profile of a relevant crowd obtained in step 1604 includes, for each keyword that appears in the user profile of at least one user in the crowd, a number of user matches for the keyword. The number of user matches for a keyword is the number of users in the crowd that have user profiles that include a matching keyword.

Lastly, the crowd analyzer 58 compares the aggregate profiles of the one or more crowds identified in step 1602 to the search terms, or keywords, in the crowd search request to identify the one or more crowds that satisfy the crowd search request (step 1606). In one embodiment, the one or more crowds that satisfy the crowd search request are those crowds from the one or more crowds identified in step 1602 that have aggregate profiles that include keywords that match all of the search terms, or keywords, in the crowd search request. In another embodiment, the crowd analyzer 58 identifies those crowds from the one or more crowds identified in step 1602 that have aggregate profiles that include keywords that match all of the search terms, or keywords, in the crowd search request. The crowd analyzer 58 then selects a predetermined number of the crowds having the highest number of user matches for the keywords in the crowd search request as the crowds that satisfy the crowd search request. Alternatively, the crowd analyzer 58 may then select crowds having at least a predefined threshold number of user matches for each of the keywords in the crowd search request as the one or more crowds that satisfy the crowd search request.

FIGS. 12 through 14 describe an exemplary process that may be used to maintain the dynamic profile slices of the user profiles of the users 20. However, the present disclosure is not limited thereto. Other processes may be used. For example, in addition to or as an alternative to monitoring crowd search requests of the users 20, crowd search requests made by the users 20 using one or more third-party search applications (e.g., Google®, Yahoo!®, or the like) may be monitored and the resulting search terms, or keywords, may be added to the dynamic profile slices of the user profiles of the users 20. Further, the present disclosure is not limited to the use of search features or applications to obtain keywords for the dynamic profile slices of the user profiles of the users 20. Other types of real-time user-generated context data may be monitored such as, for example, topics of conversation in a message board, topics of conversation in an Instant Messaging (IM) session, posts to a blog, posts to a microblog (e.g., Twitter), or the like. In addition or alternatively, other types of real-time user-generated context data may be monitored such as, for example, data obtained from one or more sensors of the mobile devices 18 of the users 20.

FIG. 15 illustrates the operation of the system 10 of FIG. 1 to enable the mobile devices 18-1 through 18-N to request crowd data for currently formed crowds wherein the crowd data is based on the dynamic profile slice of the requesting user according to one embodiment of the present disclosure. In this embodiment, weights assigned to the keywords in the dynamic profile slice of the requesting user are updated in response to receiving the crowd request. Note that while in this example the crowd request is initiated by the MAP application 32-1 of the mobile device 18-1, this discussion is equally applicable to the MAP applications 32-2 through 32-N of the other mobile devices 18-2 through 18-N. In addition, in a similar manner, crowd requests may be received from the third-party applications 34-1 through 34-N.

First, the MAP application 32-1 sends a crowd request to the MAP client 30-1 (step 1700). The crowd request is a request for crowd data including aggregate profile data for crowds currently formed near a specified POI or within a specified AOI. The crowd request may be initiated by the user 20-1 of the mobile device 18-1 via the MAP application 32-1 or may be initiated automatically by the MAP application 32-1 in response to an event such as, for example, start-up of the MAP application 32-1, movement of the user 20-1, or the like. In one embodiment, the crowd request is for a POI, where the POI is a POI corresponding to the current location of the user 20-1, a POI selected from a list of POIs defined by the user 20-1, a POI selected from a list of POIs defined by the MAP application 32-1 or the MAP server 12, a POI selected by the user 20-1 from a map, a POI implicitly defined via a separate application (e.g., the POI is implicitly defined as the location of the nearest Starbucks coffee house in response to the user 20-1 performing a Google search for "Starbucks"), or the like. If the POI is selected from a list of POIs, the list of POIs may include static POIs which may be defined by street addresses or latitude and longitude coordinates, dynamic POIs which may be defined as the current locations of one or more friends of the user 20-1, or both. Note that in some embodiments, the user 20-1 may be enabled to define a POI by selecting a crowd center of a crowd as a POI, where the POI would thereafter remain static at that point and would not follow the crowd.

In another embodiment, the crowd request is for an AOI, where the AOI may be an AOI of a predefined shape and size centered at the current location of the user 20-1, an AOI selected from a list of AOIs defined by the user 20-1, an AOI selected from a list of AOIs defined by the MAP application 32-1 or the MAP server 12, an AOI selected by the user 20-1 from a map, an AOI implicitly defined via a separate application (e.g., the AOI is implicitly defined as an area of a predefined shape and size centered at the location of the nearest Starbucks coffee house in response to the user 20-1 performing a Google search for "Starbucks"), or the like. If the AOI is selected from a list of AOIs, the list of AOIs may include static AOIs, dynamic AOIs which may be defined as areas of a predefined shape and size centered at the current locations of one or more friends of the user 20-1, or both. Note that in some embodiments, the user 20-1 may be enabled to define an AOI by selecting a crowd such that an AOI is created of a predefined shape and size centered at the crowd center of the selected crowd. The AOI would thereafter remain static and would not follow the crowd. The POI or the AOI of the crowd request may be selected by the user 20-1 via the MAP application 32-1. In yet another embodiment, the MAP application 32-1 automatically uses the current location of the user 20-1 as the POI or as a center point for an AOI of a predefined shape and size.

Upon receiving the crowd request, the MAP client 30-1 forwards the crowd request to the MAP server 12 (step 1702). Note that in some embodiments, the MAP client 30-1 may process the crowd request before forwarding the crowd request to the MAP server 12. For example, in some embodiments, the crowd request may include more than one POI or more than one AOI. As such, the MAP client 30-1 may generate a separate crowd request for each POI or each AOI.

In response to receiving the crowd request from the MAP client 30-1, the MAP server 12 updates weights assigned to the keywords in the dynamic profile slice of the user profile of the user 20-1 (step 1704). In one embodiment, the weights assigned to the keywords in the dynamic profile slice are determined using a time weighting function such that the weights decrease as the amount of time that has elapsed between the most recent timestamps for the keywords and the current time increases. Specifically, in one exemplary embodiment, the weight of each keyword in the dynamic profile slice is determined based on the following equations:

$$\text{weight} = \frac{1}{\Delta t}, \quad \text{for } \Delta t > 1, \quad \text{and} \qquad \text{Eqn. (7)}$$

$$\text{weight} = 1, \quad \text{for } 0 \leq \Delta t \leq 1, \qquad \text{Eqn. (8)}$$

where $$\Delta t = t_{CURRENT} - \text{timestamp}, \qquad \text{Eqn. (9)}$$

where $t_{CURRENT}$ is the current time and timestamp is the most recent timestamp for the keyword in the dynamic profile slice of the user profile of the user 20-1 which in the preferred embodiment described herein is the most recent time at which the user 20-1 used the keyword or a matching keyword in a crowd search request. The units of time for these equations may be, for example, hours or days.

In another embodiment, the weights assigned to the keywords in the dynamic profile slice are determined using a location weighting function such that the weights decrease as a distance between the current location of the user 20-1 and the most recent location stamps for the keywords increases. Rather than using the most recent location stamps for the keywords, the closest location stamps stored for the keywords in the dynamic profile of the user profile of the user 20-1 may be used. Specifically, in one exemplary embodiment, the weight of each keyword in the dynamic profile slice is determined based on the following equations:

$$\text{weight} = \frac{1}{\Delta d}, \quad \text{for } 1 < \Delta d \leq \Delta d_{MAX}, \qquad \text{Eqn. (10)}$$

$$\text{weight} = 1, \quad \text{for } 0 \leq \Delta d \leq 1, \quad \text{and} \qquad \text{Eqn. (11)}$$

$$\text{weight} = \frac{1}{\Delta d_{MAX}}, \quad \text{for } \Delta d > \Delta d_{MAX}, \qquad \text{Eqn. (12)}$$

where $$\Delta d = \text{location}_{CURRENT} - \text{LocationStamp}, \qquad \text{Eqn. (13)}$$

where $\Delta d_{MAX}$ is a predefined maximum value that corresponds to a predetermined minimum weight (e.g., $\Delta d_{MAX}=2$ for a predetermined minimum weight of 0.5), $\text{location}_{CURRENT}$ is the current location of the user 20-1 and LocationStamp is the most recent location stamp for the keyword in the dynamic profile slice of the user profile of the user 20-1, which in the preferred embodiment described herein is the most recent location at which the user 20-1 used the keyword or a matching keyword in a crowd search request. Alternatively, for each keyword in the dynamic profile slice of the user 20-1, the dynamic profile slice 20-1 may include multiple location stamps and corresponding timestamps for each use of the keyword by the user 20-1, and LocationStamp may be the closest location stamp for the keyword in the dynamic profile slice of the user 20-1. The units of distance for these equations may be, for example, miles, 100 feet (i.e., 1 unit of distance=100 feet), or the like.

In yet another embodiment, the weights of the keywords in the dynamic profile slice of the user 20-1 may be determined using a time and location weighting function. More specifically, as an example, the weight for each keyword in the dynamic profile slice of the user 20-1 may be determined based on the following equations:

$$\text{weight} = \frac{\text{weight}_{TIME} + \text{weight}_{LOCATION}}{2}, \qquad \text{Eqn. (14)}$$

where $$\text{weight}_{TIME} = \frac{1}{\Delta t}, \quad \text{for } \Delta t > 1, \quad \text{and} \qquad \text{Eqn. (15)}$$

$$\text{weight}_{TIME} = 1, \quad \text{for } 0 \leq \Delta t \leq 1, \quad \text{and} \qquad \text{Eqn. (16)}$$

$$\text{weight}_{DISTANCE} = \frac{1}{\Delta d}, \quad \text{for } 1 < \Delta d \leq \Delta d_{MAX}, \qquad \text{Eqn. (17)}$$

$$\text{weight}_{DISTANCE} = 1, \quad \text{for } 0 \leq \Delta d \leq 1, \quad \text{and} \qquad \text{Eqn. (18)}$$

$$\text{weight}_{DISTANCE} = \frac{1}{\Delta d_{MAX}}, \quad \text{for } \Delta d > \Delta d_{MAX}. \qquad \text{Eqn. (19)}$$

Note that rather than using a straight average of $\text{weight}_{DISTANCE}$ and $\text{weight}_{TIME}$, a weighted average may be used where $\text{weight}_{DISTANCE}$ and $\text{weight}_{TIME}$ are themselves assigned weights either by the system 10 or the user 20-1. While not illustrated, after updating the weights assigned to the keywords in the dynamic profile slice of the user 20-1, the MAP sever 12 may optionally remove keywords from the dynamic profile slice having weights that have fallen below a predefined threshold such as, for example, 0.5.

In addition to updating the weights, the MAP server 12 identifies one or more crowds relevant to the crowd request (step 1706). More specifically, in one embodiment, the crowd analyzer 58 performs a crowd formation process such as that described above in FIG. 6 to form one or more crowds relevant to the POI or the AOI of the crowd request. In another embodiment, the crowd analyzer 58 proactively forms crowds using a process such as that described above in FIGS. 8A through 8D and stores corresponding crowd records in the datastore 64 of the MAP server 12. Then, rather than forming the relevant crowds in response to the crowd request, the crowd analyzer 58 queries the datastore 64 to identify the crowds that are relevant to the crowd request. The crowds relevant to the crowd request may be those crowds within or intersecting a bounding region, such as a bounding box, for the crowd request. If the crowd request is for a POI, the bounding region is a geographic region of a predefined shape and size centered at or otherwise encompassing the POI. If the crowd request is for an AOI, the bounding region is the AOI.

Once the crowd analyzer 58 has identified the crowds relevant to the crowd request, the MAP server 12 generates crowd data for the identified crowds (step 1708). In this embodiment, the crowd data includes aggregate profiles for the identified crowds. As discussed below in detail, here, the aggregate profiles for the crowds are generated based on the dynamic profile slice of the user 20-1. In one specific embodiment, the user 20-1 is enabled to select one or more profile categories, or profile slices, from his user profile to be used to generate aggregate profile data in response to crowd requests from the user 20-1. In this example, the user 20-1 has selected at least his dynamic profile slice. The crowd data for the identified crowds may also include information characterizing the crowds, spatial information defining the locations of the crowds, the number of users in the crowds, the amount of time the crowds have been located at or near the POI or within the AOI of the crowd request, or the like. The MAP server 12 then returns the crowd data to the MAP client 30-1 (step 1710).

Upon receiving the crowd data, the MAP client 30-1 forwards the crowd data to the MAP application 32-1 (step 1712). Note that in some embodiments the MAP client 30-1 may process the crowd data before sending the crowd data to the MAP application 32-1. The MAP application 32-1 then presents the crowd data to the user 20-1 (step 1714). The manner in which the crowd data is presented depends on the particular implementation of the MAP application 32-1. In one embodiment, the crowd data is overlaid upon a map. For example, the crowds may be represented by corresponding indicators overlaid on a map. The user 20-1 may then select a crowd in order to view additional crowd data regarding that crowd such as, for example, the aggregate profile of that crowd, characteristics of that crowd, or the like.

FIG. 16 illustrates a process for generating aggregate profiles for the crowds identified in step 1706 of FIG. 15 based on the dynamic profile slice of the requesting user including the weights assigned to the keywords in the dynamic profile slice in step 1704 of FIG. 15 according to one embodiment of the present disclosure. In this embodiment, upon receiving the crowd request and updating the weights of the keywords in the dynamic profile slice of the user 20-1, the MAP server 12 triggers the crowd analyzer 58 to identify crowds relevant to the current request as discussed above with respect to step 1706 of FIG. 15, and then passes the identified crowds to the aggregation engine 60 in order to generate aggregate profiles for the identified crowds.

More specifically, after the crowd analyzer 58 has identified the crowds relevant to the crowd request, the identified crowds are passed to the aggregation engine 60. The aggregation engine 60 selects a next crowd to process, which for the first iteration is the first crowd (step 1800). The aggregation engine 60 then selects the next user in the crowd (step 1802). Next, the aggregation engine 60 compares the user profile of the user in the crowd to the dynamic profile slice of the user profile of the requesting user, which for this example is the user 20-1 of the mobile device 18-1 (step 1804). Notably, in this example, the user 20-1 has selected the dynamic profile slice of his user profile as the profile category, or profile slice, to be used for generating the aggregate profiles of the crowds in response to the crowd request. However, the present disclosure is not limited thereto. For instance, in another embodiment, the entire user profile of the user 20-1 including the dynamic profile slice may be compared to the user profile of the user in the crowd. In one embodiment, when comparing the user profile of the user in the crowd to the dynamic profile slice of the user profile of the user 20-1, the aggregation engine 60 identifies matches between the user profile of the user in the crowd and the dynamic profile slice of the user profile of the user 20-1. More specifically, the aggregation engine 60 may make a list of keywords from the user profile of the user in the crowd that match keywords in the dynamic profile slice of the user profile of the user 20-1.

Next, the aggregation engine 60 determines whether there are more users in the crowd (step 1806). If so, the process returns to step 1802 and is repeated for the next user in the crowd. Once all of the users in the crowd have been processed, the aggregation engine 60 generates an aggregate profile for the crowd based on data resulting from the comparisons of the user profiles of the users in the crowd to the dynamic profile slice of the user profile of the user 20-1 (step 1808). In one embodiment, the data resulting from the comparisons is a list of matching keywords for each of the users in the crowd. The aggregate profile may then include an overall match strength, or score, computed based on the number of user matches for each keyword in the dynamic profile slice of the user profile of the user 20-1 and the corresponding weights assigned to the keywords. For example, the overall match strength may be a weighted average of the number of user matches across all keywords in the dynamic profile slice of the user profile of the user 20-1, which may be computed based on the following equation:

$$OverallMatchStrength = \frac{\sum_{i=1}^{N} weight_i \times UserMatches_i}{\sum_{i=1}^{N} weight_i}, \quad \text{Eqn. (20)}$$

where OverallMatchStrength is the overall match strength, $weight_i$ is the weight assigned to the i-th keyword in the dynamic profile slice, $UserMatches_i$ is the number of user matches for the i-th keyword in the dynamic profile slice, and N is the number of keywords in the dynamic profile slice. As another example, the overall match strength may be based on a ratio of the weighted average of the number of user matches across all keywords in the dynamic profile slice of the user profile of the user 20-1 over the total number of users in the crowd, which may be computed based on the following equation:

$$OverallMatchStrength = \frac{\sum_{i=1}^{N} weight_i \times UserMatches_i}{TotalUsers \times \sum_{i=1}^{N} weight_i} \times 100, \quad \text{Eqn. (21)}$$

where TotalUsers is the total number of users in the crowd and the overall match strength is on an exemplary scale of 0 to 100.

In addition or alternatively, the aggregate profile may include a match strength, or score, for each individual keyword in the dynamic profile slice that is based on the number of user matches for the keyword and the weight assigned to the keyword. For example, for each keyword in the dynamic profile slice, the match strength for the keyword may be the product of the number of user matches for the keyword and the weight assigned to the keyword, which is expressed as the following equation:

$$MatchStrength_i = weight_i \times UserMatches_i, \quad \text{Eqn. (22)}$$

where MatchStrength, is the match strength for the i-th keyword in the dynamic profile slice, weight, is the weight assigned to the i-th keyword in the dynamic profile slice, and UserMatches, is the number of user matches for the i-th keyword in the dynamic profile slice. As another example, for each keyword in the dynamic profile slice, the match strength of the keyword may be based on a ratio of the product of the number of user matches for keyword and the weight assigned to the keyword over the total number of users in the crowd, which may be computed based on the following equation:

$$MatchStrength_i = \frac{weight_i \times UserMatches_i}{TotalUsers} \times 100, \quad \text{Eqn. (23)}$$

where TotalUsers is the total number of users in the crowd and the overall match strength is on an exemplary scale of 0 to 100. In addition to the overall match strength and/or the match strengths of the individual keywords in the dynamic profile slice of the user profile of the user 20-1, the aggregate profile may additionally include the total number of users in the crowd.

Once the aggregate profile of the crowd is generated, the aggregation engine 60 determines whether there are more crowds to process (step 1810). If so, the process returns to step 1800 and is repeated for the next crowd. Once aggregate profiles have been generated for all of the crowds relevant to the crowd request, the aggregate profiles for the crowds are returned (step 1812). More specifically, the aggregate profiles are included in the crowd data returned to the MAP client 30-1 in response to the current request as described above with respect to step 1710 of FIG. 15.

FIGS. 15 and 16 describe an embodiment in which the weights assigned to the keywords in the dynamic profile slices of the user profiles of the users 20 are updated reactively in response to receiving crowd requests from the mobile devices 18 of the users 20. FIG. 17 illustrates an alternative embodiment in which the MAP server 12 periodically updates the weights assigned to the keywords in the dynamic profile slices of the user profiles of the users 20 in a proactive manner. For example, the process of FIG. 17 may be implemented as a background process. As illustrated, the MAP server 12, and more specifically the profile manager 52 of the MAP server 12, first determines whether it is time to update the weights assigned to the keywords in the dynamic profile slices of the user profiles of the users 20 (step 1900). The profile manager 52 may update the weights assigned to the keywords at a static time interval or a configurable time interval. For example, the profile manager 52 may update the weights assigned to the keywords every hour. If it is not yet time to update the weights, the profile manager 52 waits a predefined amount of time (step 1902) and then returns to step 1900.

Once it is time to update the weights, the profile manager 52 sets a first counter i to a value of 1 (step 1904). Next, the profile manager 52 gets the dynamic profile slice of user i (step 1906). The profile manager 52 next sets a second counter j to a value of 1 (step 1908). The profile manager 52 then gets the keyword j from the dynamic profile slice of user i (step 1910). Next, the profile manager 52 computes and stores a weight for keyword j using a time and/or location weighting function (step 1912). More specifically, in one embodiment, the weight is computed using a time weighting function such that the weight assigned to the keyword is inversely related to the amount of time that has elapsed since the keyword was last detected for user i as indicated by the most recent timestamp stored for keyword j in the dynamic profile slice of user i. For example, the weight may be computed using Equations (7) through (9) described above. In another embodiment, the weight is computed using a location weighting function such that the weight assigned to the keyword is inversely related to the distance between the current location of user i and the most recent location or alternatively the nearest location at which keyword j has been detected for user i as indicated by the timestamp and location stamp information stored for keyword j in the dynamic profile slice of user i. For example, the weight may be computed using Equations (10) through (13) described above. In yet another embodiment, the weight is computed based on a time and location weighting function. For example, the weight may be computed using Equations (14) through (19) described above.

Once the weight for keyword j in the dynamic profile slice of user i is computed and stored in the dynamic profile slice of user i, the profile manager 52 determines whether the last keyword in the dynamic profile slice of user i has been processed (step 1914). If not, the second counter j is incremented (step 1916) and the process returns to step 1910 and is repeated for the next keyword. Once the last keyword has been processed, the profile manager 52 determines whether the last user 20 has been processed (step 1918). If not, the first counter i is incremented (step 1920) and the process returns to step 1906 and is repeated for the next user 20. Once the last user 20 has been processed, the process returns to step 1900 and is repeated.

FIG. 18 illustrates the operation of the system 10 of FIG. 1 to enable the mobile devices 18-1 through 18-N to request crowd data for currently formed crowds wherein the crowd data is based on the dynamic profile slice of the user profile of the requesting user according to another embodiment of the present disclosure. This embodiment is substantially the same as that of FIG. 15. However, in this embodiment, rather than updating the weights of the keywords in the dynamic profile slice of the user profile of the requesting user in response to receiving the crowd request as done in FIG. 15, the MAP server 12 utilizes the weights of the keywords in the dynamic profile slice of the user profile of the requesting user as proactively maintained by the profile manager 52 using the process of FIG. 17. Note that while in this example the crowd request is initiated by the MAP application 32-1 of the mobile device 18-1, this discussion is equally applicable to the MAP applications 32-2 through 32-N of the other mobile devices 18-2 through 18-N. In addition, in a similar manner, crowd requests may be received from the third-party applications 34-1 through 34-N.

First, the MAP application 32-1 sends a crowd request to the MAP client 30-1 (step 2000). Again, the crowd request is a request for crowd data including aggregate profile data for crowds currently formed near a specified POI or within a specified AOI. The crowd request may be initiated by the user 20-1 of the mobile device 18-1 via the MAP application 32-1 or may be initiated automatically by the MAP application 32-1 in response to an event such as, for example, start-up of the MAP application 32-1, movement of the user 20-1, or the like. In one embodiment, the crowd request is for a POI, where the POI is a POI corresponding to the current location of the user 20-1, a POI selected from a list of POIs defined by the user 20-1, a POI selected from a list of POIs defined by the MAP application 32-1 or the MAP server 12, a POI selected by the user 20-1 from a map, a POI implicitly defined via a separate application (e.g., the POI is implicitly defined as the location of the nearest Starbucks coffee house in response to the user 20-1 performing a Google search for "Starbucks"), or the like. If the POI is selected from a list of POIs, the list of POIs may include static POIs which may be defined by street addresses or latitude and longitude coordinates, dynamic POIs which may be defined as the current locations of one or more friends of the user 20-1, or both. Note that in some embodiments, the user 20-1 may be enabled to define a POI by selecting a crowd center of a crowd as a POI, where the POI would thereafter remain static at that point and would not follow the crowd.

In another embodiment, the crowd request is for an AOI, where the AOI may be an AOI of a predefined shape and size centered at the current location of the user 20-1, an AOI selected from a list of AOIs defined by the user 20-1, an AOI selected from a list of AOIs defined by the MAP application 32-1 or the MAP server 12, an AOI selected by the user 20-1 from a map, an AOI implicitly defined via a separate application (e.g., the AOI is implicitly defined as an area of a predefined shape and size centered at the location of the nearest Starbucks coffee house in response to the user 20-1 performing a Google search for "Starbucks"), or the like. If the AOI is selected from a list of AOIs, the list of AOIs may include static AOIs, dynamic AOIs which may be defined as areas of a predefined shape and size centered at the current locations of one or more friends of the user 20-1, or both. Note that in some embodiments, the user 20-1 may be enabled to define an AOI by selecting a crowd such that an AOI is created of a predefined shape and size centered at the crowd center of the selected crowd. The AOI would thereafter remain static and would not follow the crowd. The POI or the AOI of the crowd request may be selected by the user 20-1 via the MAP application 32-1. In yet another embodiment, the MAP application 32-1 automatically uses the current location of the user 20-1 as the POI or as a center point for an AOI of a predefined shape and size.

Upon receiving the crowd request, the MAP client 30-1 forwards the crowd request to the MAP server 12 (step 2002). Note that in some embodiments, the MAP client 30-1 may process the crowd request before forwarding the crowd request to the MAP server 12. For example, in some embodiments, the crowd request may include more than one POI or more than one AOI. As such, the MAP client 30-1 may generate a separate crowd request for each POI or each AOI.

In response to receiving the crowd request from the MAP client 30-1, the MAP server 12 identifies one or more crowds relevant to the crowd request (step 2004). More specifically, in one embodiment, the crowd analyzer 58 performs a crowd formation process such as that described above in FIG. 6 to form one or more crowds relevant to the POI or the AOI of the crowd request. In another embodiment, the crowd analyzer 58 proactively forms crowds using a process such as that described above in FIGS. 8A through 8D and stores corresponding crowd records in the datastore 64 of the MAP server 12. Then, rather than forming the relevant crowds in response to the crowd request, the crowd analyzer 58 queries the datastore 64 to identify the crowds that are relevant to the crowd request. The crowds relevant to the crowd request may be those crowds within or intersecting a bounding region, such as a bounding box, for the crowd request. If the crowd request is for a POI, the bounding region is a geographic region of a predefined shape and size centered at or otherwise encompassing the POI. If the crowd request is for an AOI, the bounding region is the AOI.

Once the crowd analyzer 58 has identified the crowds relevant to the crowd request, the MAP server 12 generates crowd data for the identified crowds (step 2006). In this embodiment, the crowd data includes aggregate profiles for the identified crowds generated based on the dynamic profile slice of the user profile of the user 20-1 in the manner described above. The crowd data for the identified crowds may also include information characterizing the crowds, spatial information defining the locations of the crowds, the number of users in the crowds, the amount of time the crowds have been located at or near the POI or within the AOI of the crowd request, or the like. The MAP server 12 then returns the crowd data to the MAP client 30-1 (step 2008).

Upon receiving the crowd data, the MAP client 30-1 forwards the crowd data to the MAP application 32-1 (step 2010). Note that in some embodiments the MAP client 30-1 may process the crowd data before sending the crowd data to the MAP application 32-1. The MAP application 32-1 then presents the crowd data to the user 20-1 (step 2012). The manner in which the crowd data is presented depends on the particular implementation of the MAP application 32-1. In one embodiment, the crowd data is overlaid upon a map. For example, the crowds may be represented by corresponding indicators overlaid on a map. The user 20-1 may then select a crowd in order to view additional crowd data regarding that crowd such as, for example, the aggregate profile of that crowd, characteristics of that crowd, or the like.

FIG. 19 is a block diagram of the MAP server 12 according to one embodiment of the present disclosure. As illustrated, the MAP server 12 includes a controller 132 connected to memory 134, one or more secondary storage devices 136, and a communication interface 138 by a bus 140 or similar mechanism. The controller 132 is a microprocessor, digital Application Specific Integrated Circuit (ASIC), Field Programmable Gate Array (FPGA), or the like. In this embodiment, the controller 132 is a microprocessor, and the application layer 40, the business logic layer 42, and the object mapping layer 62 (FIG. 2) are implemented in software and stored in the memory 134 for execution by the controller 132. Further, the datastore 64 (FIG. 2) may be implemented in the one or more secondary storage devices 136. The secondary storage devices 136 are digital data storage devices such as, for example, one or more hard disk drives. The communication interface 138 is a wired or wireless communication interface that communicatively couples the MAP server 12 to the network 28 (FIG. 1). For example, the communication interface 138 may be an Ethernet interface, local wireless interface such as a wireless interface operating according to one of the suite of IEEE 802.11 standards, or the like.

FIG. 20 is a block diagram of the mobile device 18-1 according to one embodiment of the present disclosure. This discussion is equally applicable to the other mobile devices 18-2 through 18-N. As illustrated, the mobile device 18-1 includes a controller 142 connected to memory 144, a communication interface 146, one or more user interface components 148, and the location function 36-1 by a bus 150 or similar mechanism. The controller 142 is a microprocessor, digital ASIC, FPGA, or the like. In this embodiment, the controller 142 is a microprocessor, and the MAP client 30-1, the MAP application 32-1, and the third-party applications 34-1 are implemented in software and stored in the memory 144 for execution by the controller 142. In this embodiment, the location function 36-1 is a hardware component such as, for example, a GPS receiver. The communication interface 146 is a wireless communication interface that communicatively couples the mobile device 18-1 to the network 28 (FIG. 1). For example, the communication interface 146 may be a local wireless interface such as a wireless interface operating according to one of the suite of IEEE 802.11 standards, a mobile communications interface such as a cellular telecommunications interface, or the like. The one or more user interface components 148 include, for example, a touchscreen, a display, one or more user input components (e.g., a keypad), a speaker, or the like, or any combination thereof.

Those skilled in the art will recognize improvements and modifications to the preferred embodiments of the present disclosure. All such improvements and modifications are considered within the scope of the concepts disclosed herein and the claims that follow.

What is claimed is:

1. A computer-implemented method comprising:
monitoring a real-time user-generated context of a user to accumulate a plurality of keywords in a dynamic profile slice of a user profile of the user that are representative of dynamic interests of the user and, for each keyword of the plurality of keywords, a timestamp that defines a most recent time at which the keyword was obtained from the real-time user-generated context of the user, wherein, for each keyword of the plurality of keywords, the dynamic profile slice further comprises a location stamp that defines a location at which the user was located at the most recent time at which the keyword was obtained from the real-time user-generated context of the user;
for each keyword of the plurality of keywords, assigning a weight to the keyword as a function of both an amount of time that has elapsed since the most recent time at which the keyword was obtained from the real-time user-generated context of the user as indicated by the timestamp for the keyword and a distance between a current location of the user and the location at which the user was located at the most recent time at which the keyword was obtained from the real-time user-generated context of the user as indicated by the location stamp for the keyword;
receiving a crowd request from a mobile device of the user;
in response to the crowd request, identifying one or more crowds of users currently located within a bounding region created for the crowd request;
for each crowd of the one or more crowds, obtaining crowd data for the crowd that comprises an aggregate profile of the crowd generated based on a comparison of at least the dynamic profile slice of the user profile of the user to user profiles of a plurality of users in the crowd; and
returning the crowd data for the one or more crowds to the mobile device of the user.

2. The method of claim 1 wherein the real-time user-generated context of the user comprises search terms entered by the user, and monitoring the real-time user-generated context comprises monitoring the search terms entered by the user to accumulate at least a portion of the plurality of keywords in the dynamic profile slice of the user.

3. The method of claim 1 wherein the real-time user-generated context of the user comprises search terms entered by the user to search for crowds of users having user profiles that match the search terms, and monitoring the real-time user-generated context comprises monitoring the search terms entered by the user to accumulate at least a portion of the plurality of keywords in the dynamic profile slice of the user.

4. The method of claim 1 wherein, for each keyword of the plurality of keywords, assigning the weight to the keyword comprises assigning the weight to the keyword in response to receiving the crowd request from the mobile device of the user.

5. The method of claim 1 wherein, for each crowd of the one or more crowds, the aggregate profile of the crowd comprises an overall match strength computed based on the weights assigned to the plurality of keywords in the dynamic profile slice of the user profile of the user and a number of user matches between each keyword of the plurality of keywords in the dynamic profile slice of the user profile of the user and the user profiles of the plurality of users in the crowd.

6. The method of claim 1 wherein, for each crowd of the one or more crowds, the aggregate profile of the crowd comprises, for each keyword of the plurality of keywords in the dynamic profile slice, a match strength computed based on the weight assigned to the keyword and a number of user matches between the keyword and the user profiles of the plurality of users in the crowd.

7. The method of claim 1 further comprising maintaining, for each user of a plurality of users comprising the user, a user profile that comprises a dynamic profile slice, wherein for each user of the plurality of users, maintaining the user profile of the user that comprises the dynamic profile slice comprises:
monitoring a real-time user-generated context of the user to accumulate a plurality of keywords in the dynamic profile slice of the user profile of the user that are representative of dynamic interests of the user and, for each keyword of the plurality of keywords, a timestamp that defines a most recent time at which the keyword was obtained from the real-time user-generated context of the user; and
for each keyword of the plurality of keywords, assigning a weight to the keyword as a function of an amount of time that has elapsed since the most recent time at which the keyword was obtained from the real-time user-generated context of the user as indicated by the timestamp for the keyword.

8. The method of claim 7 further comprising periodically updating the weights assigned to the plurality of keywords in the dynamic profile slice of each of the plurality of users.

9. The method of claim 1 further comprising updating the weights assigned to the plurality of keywords over time.

10. The method of claim 9 further comprising removing a keyword of the plurality of keywords from the dynamic profile slice once the weight assigned to the keyword falls below a predefined threshold.

11. A server comprising:
a communication interface communicatively coupling the server to a device of a user via a network; and
a processor associated with the communication interface and adapted to:
monitor a real-time user-generated context of the user at the device to accumulate a plurality of keywords in a dynamic profile slice of a user profile of the user that are representative of dynamic interests of the user and, for each keyword of the plurality of keywords, a timestamp that defines a most recent time at which the keyword was obtained from the real-time user-generated context of the user, wherein, for each keyword of the plurality of keywords, the dynamic profile slice further comprises a location stamp that defines a location at which the user was located at the most recent time at which the keyword was obtained from the real-time user-generated context of the user;

for each keyword of the plurality of keywords, assigning a weight to the keyword as a function of both an amount of time that has elapsed since the most recent time at which the keyword was obtained from the real-time user-generated context of the user as indicated by the timestamp for the keyword and a distance between a current location of the user and the location at which the user was located at the most recent time at which the keyword was obtained from the real-time user-generated context of the user as indicated by the location stamp for the keyword;

receive a crowd request from a mobile device of the user;

in response to the crowd request, identify one or more crowds of users currently located within a bounding region created for the crowd request;

for each crowd of the one or more crowds, obtain crowd data for the crowd that comprises an aggregate profile of the crowd generated based on a comparison of at least the dynamic profile slice of the user profile of the user to user profiles of a plurality of users in the crowd; and return the crowd data for the one or more crowds to the mobile device of the user.

12. A non-transitory computer readable medium storing software for instructing a controller of a computing device to:

monitor a real-time user-generated context of a user to accumulate a plurality of keywords in a dynamic profile slice of a user profile of the user that are representative of dynamic interests of the user and, for each keyword of the plurality of keywords, a timestamp that defines a most recent time at which the keyword was obtained from the real-time user-generated context of the user, wherein, for each keyword of the plurality of keywords, the dynamic profile slice further comprises a location stamp that defines a location at which the user was located at the most recent time at which the keyword was obtained from the real-time user-generated context of the user;

for each keyword of the plurality of keywords, assign a weight to the keyword as a function of both an amount of time that has elapsed since the most recent time at which the keyword was obtained from the real-time user-generated context of the user as indicated by the timestamp for the keyword and a distance between a current location of the user and the location at which the user was located at the most recent time at which the keyword was obtained from the real-time user-generated context of the user as indicated by the location stamp for the keyword;

receive a crowd request from a mobile device of the user;

in response to the crowd request, identify one or more crowds of users currently located within a bounding region created for the crowd request;

for each crowd of the one or more crowds, obtain crowd data for the crowd that comprises an aggregate profile of the crowd generated based on a comparison of at least the dynamic profile slice of the user profile of the user to user profiles of a plurality of users in the crowd; and return the crowd data for the one or more crowds to the mobile device of the user.

* * * * *